United States Patent
Addanki et al.

(10) Patent No.: US 9,806,949 B2
(45) Date of Patent: *Oct. 31, 2017

(54) TRANSPARENT INTERCONNECTION OF ETHERNET FABRIC SWITCHES

(71) Applicant: BROCADE COMMUNICATIONS SYSTEMS, INC., San Jose, CA (US)

(72) Inventors: Venkata R. K. Addanki, Cupertino, CA (US); Mythilikanth Raman, San Jose, CA (US); Shunjia Yu, San Jose, CA (US)

(73) Assignee: BROCADE COMMUNICATIONS SYSTEMS, INC., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/473,941

(22) Filed: Aug. 29, 2014

(65) Prior Publication Data

US 2015/0071122 A1 Mar. 12, 2015

Related U.S. Application Data

(60) Provisional application No. 61/874,919, filed on Sep. 6, 2013.

(51) Int. Cl.
*H04L 12/28* (2006.01)
*H04L 12/24* (2006.01)
(Continued)

(52) U.S. Cl.
CPC .......... *H04L 41/0886* (2013.01); *H04L 41/16* (2013.01); *H04L 49/15* (2013.01); *H04L 49/70* (2013.01); *H04L 45/245* (2013.01)

(58) Field of Classification Search
CPC ... H04L 41/0886; H04L 41/16; H04L 45/245; H04L 49/15; H04L 49/70
(Continued)

(56) References Cited

U.S. PATENT DOCUMENTS 5,390,173 A 2/1995 Spinney
5,802,278 A 9/1998 Isfeld
(Continued)

FOREIGN PATENT DOCUMENTS

CN 1735062 2/2006
CN 1777149 5/2006
(Continued)

OTHER PUBLICATIONS

Mahalingam "VXLAN: A Framework for Overlaying Virtualized Layer 2 Networks over Layer 3 Networks" Oct. 17, 2013 pp. 1-22, Sections 1, 4 and 4.1.
(Continued)

*Primary Examiner* — Khaled Kassim
*Assistant Examiner* — Berhanu Belete
(74) *Attorney, Agent, or Firm* — Shun Yao; Park, Vaughan, Fleming & Dowler LLP

(57) ABSTRACT

One embodiment of the present invention provides a switch. The switch includes a fabric switch module and a border module. The fabric switch module maintains a membership in a first fabric switch. The fabric switch includes a plurality of switches and operates as a single logical switch. The border module determines that the egress switch identifier in a first encapsulation header of a first packet is associated with a switch outside of the fabric switch. The first packet is forwardable in the first fabric switch based on the first encapsulation header. In response to the determination, the border module changes the ingress switch identifier in the first encapsulation header of the first packet to a first virtual switch identifier associated with a first virtual switch. This first virtual switch externally represents the first fabric switch.

25 Claims, 10 Drawing Sheets

(51) Int. Cl.
*H04L 12/933* (2013.01)
*H04L 12/931* (2013.01)
*H04L 12/709* (2013.01)

(58) Field of Classification Search
USPC .................................. 370/395.53, 219, 401
See application file for complete search history.

(56) References Cited

U.S. PATENT DOCUMENTS

| | | | |
|---|---|---|---|
| 5,878,232 A | 3/1999 | Marimuthu | |
| 5,959,968 A | 9/1999 | Chin | |
| 5,973,278 A | 10/1999 | Wehrli, III | |
| 5,983,278 A | 11/1999 | Chong | |
| 6,041,042 A | 3/2000 | Bussiere | |
| 6,085,238 A | 7/2000 | Yuasa | |
| 6,104,696 A | 8/2000 | Kadambi | |
| 6,185,214 B1 | 2/2001 | Schwartz | |
| 6,185,241 B1 | 2/2001 | Sun | |
| 6,438,106 B1 | 8/2002 | Pillar | |
| 6,498,781 B1 | 12/2002 | Bass | |
| 6,542,266 B1 | 4/2003 | Phillips | |
| 6,633,761 B1 | 10/2003 | Singhal | |
| 6,771,610 B1 | 8/2004 | Seaman | |
| 6,870,840 B1 | 3/2005 | Hill | |
| 6,873,602 B1 | 3/2005 | Ambe | |
| 6,937,576 B1 | 8/2005 | DiBenedetto | |
| 6,956,824 B2 | 10/2005 | Mark | |
| 6,957,269 B2 | 10/2005 | Williams | |
| 6,975,581 B1 | 12/2005 | Medina | |
| 6,975,864 B2 | 12/2005 | Singhal | |
| 7,016,352 B1 | 3/2006 | Chow | |
| 7,061,877 B1 | 6/2006 | Gummalla | |
| 7,173,934 B2 | 2/2007 | Lapuh | |
| 7,197,308 B2 | 3/2007 | Singhal | |
| 7,206,288 B2 | 4/2007 | Cometto | |
| 7,310,664 B1 | 12/2007 | Merchant | |
| 7,313,637 B2 | 12/2007 | Tanaka | |
| 7,315,545 B1 | 1/2008 | Chowdhury et al. | |
| 7,316,031 B2 | 1/2008 | Griffith | |
| 7,330,897 B2 | 2/2008 | Baldwin | |
| 7,380,025 B1 | 5/2008 | Riggins | |
| 7,397,768 B1 | 7/2008 | Betker | |
| 7,397,794 B1 | 7/2008 | Lacroute | |
| 7,430,164 B2 | 9/2008 | Bare | |
| 7,453,888 B2 | 11/2008 | Zabihi | |
| 7,477,894 B1 | 1/2009 | Sinha | |
| 7,480,258 B1 | 1/2009 | Shuen | |
| 7,508,757 B2 | 3/2009 | Ge | |
| 7,558,195 B1 | 7/2009 | Kuo | |
| 7,558,273 B1 | 7/2009 | Grosser | |
| 7,571,447 B2 | 8/2009 | Ally | |
| 7,599,901 B2 | 10/2009 | Mital | |
| 7,653,056 B1 * | 1/2010 | Dianes | H04L 12/465 370/389 |
| 7,688,736 B1 | 3/2010 | Walsh | |
| 7,688,960 B1 | 3/2010 | Aubuchon | |
| 7,690,040 B2 | 3/2010 | Frattura | |
| 7,706,255 B1 | 4/2010 | Kondrat et al. | |
| 7,716,370 B1 | 5/2010 | Devarapalli | |
| 7,720,076 B2 | 5/2010 | Dobbins | |
| 7,729,296 B1 | 6/2010 | Choudhary | |
| 7,787,480 B1 * | 8/2010 | Mehta et al. | 370/401 |
| 7,792,920 B2 | 9/2010 | Istvan | |
| 7,796,593 B1 | 9/2010 | Ghosh | |
| 7,808,992 B2 | 10/2010 | Homchaudhuri | |
| 7,836,332 B2 | 11/2010 | Hara | |
| 7,843,906 B1 | 11/2010 | Chidambaram et al. | |
| 7,843,907 B1 | 11/2010 | Abou-Emara | |
| 7,860,097 B1 | 12/2010 | Lovett | |
| 7,898,959 B1 | 3/2011 | Arad | |
| 7,924,837 B1 | 4/2011 | Shabtay | |
| 7,937,438 B1 | 5/2011 | Miller | |
| 7,937,756 B2 | 5/2011 | Kay | |
| 7,945,941 B2 | 5/2011 | Sinha | |
| 7,949,638 B1 | 5/2011 | Goodson | |
| 7,957,386 B1 | 6/2011 | Aggarwal | |
| 8,018,938 B1 * | 9/2011 | Fromm | H04L 12/4654 370/392 |
| 8,027,354 B1 | 9/2011 | Portolani | |
| 8,054,832 B1 | 11/2011 | Shukla | |
| 8,068,442 B1 | 11/2011 | Kompella | |
| 8,078,704 B2 | 12/2011 | Lee | |
| 8,090,805 B1 | 1/2012 | Chawla | |
| 8,102,781 B2 | 1/2012 | Smith | |
| 8,102,791 B2 | 1/2012 | Tang | |
| 8,116,307 B1 | 2/2012 | Thesayi | |
| 8,125,928 B2 | 2/2012 | Mehta | |
| 8,134,922 B2 | 3/2012 | Elangovan | |
| 8,155,150 B1 | 4/2012 | Chung | |
| 8,160,063 B2 | 4/2012 | Maltz | |
| 8,160,080 B1 | 4/2012 | Arad | |
| 8,170,038 B2 | 5/2012 | Belanger | |
| 8,194,674 B1 | 6/2012 | Pagel | |
| 8,195,774 B2 | 6/2012 | Lambeth | |
| 8,204,061 B1 | 6/2012 | Sane | |
| 8,213,313 B1 | 7/2012 | Doiron | |
| 8,213,336 B2 | 7/2012 | Smith | |
| 8,230,069 B2 | 7/2012 | Korupolu | |
| 8,239,960 B2 | 8/2012 | Frattura | |
| 8,249,069 B2 | 8/2012 | Raman | |
| 8,270,401 B1 | 9/2012 | Barnes | |
| 8,295,291 B1 | 10/2012 | Ramanathan et al. | |
| 8,295,921 B2 | 10/2012 | Wang | |
| 8,301,686 B1 | 10/2012 | Appajodu | |
| 8,339,994 B2 | 12/2012 | Gnanasekaran | |
| 8,351,352 B1 | 1/2013 | Eastlake | |
| 8,369,335 B2 | 2/2013 | Jha | |
| 8,369,347 B2 | 2/2013 | Xiong | |
| 8,392,496 B2 | 3/2013 | Linden | |
| 8,451,717 B2 | 5/2013 | Venkataraman | |
| 8,462,774 B2 | 6/2013 | Page | |
| 8,467,375 B2 | 6/2013 | Blair | |
| 8,520,595 B2 | 8/2013 | Yadav | |
| 8,553,710 B1 | 10/2013 | White | |
| 8,595,479 B2 * | 11/2013 | Radhakrishnan | H04L 63/0272 713/153 |
| 8,599,850 B2 | 12/2013 | Jha | |
| 8,599,864 B2 | 12/2013 | Chung | |
| 8,615,008 B2 | 12/2013 | Natarajan | |
| 8,619,788 B1 | 12/2013 | Sankaran | |
| 8,625,616 B2 * | 1/2014 | Vobbilisetty | H04L 49/357 370/328 |
| 8,705,526 B1 | 4/2014 | Hasan | |
| 8,706,905 B1 | 4/2014 | McGlaughlin | |
| 8,717,895 B2 | 5/2014 | Koponen | |
| 8,724,456 B1 | 5/2014 | Hong | |
| 8,792,501 B1 | 7/2014 | Rustagi | |
| 8,798,055 B1 | 8/2014 | An | |
| 8,804,736 B1 | 8/2014 | Drake | |
| 8,806,031 B1 | 8/2014 | Kondur | |
| 8,826,385 B2 | 9/2014 | Congdon | |
| 8,937,865 B1 | 1/2015 | Kumar | |
| 8,948,181 B2 | 2/2015 | Kapadia | |
| 9,019,976 B2 * | 4/2015 | Gupta | H04L 12/4625 370/401 |
| 9,178,793 B1 | 11/2015 | Marlow | |
| 9,231,890 B2 * | 1/2016 | Vobbilisetty | H04L 45/586 |
| 9,401,818 B2 | 7/2016 | Venkatesh | |
| 9,438,447 B2 | 9/2016 | Basso | |
| 2001/0005527 A1 | 6/2001 | Vaeth | |
| 2001/0055274 A1 | 12/2001 | Hegge | |
| 2002/0019904 A1 | 2/2002 | Katz | |
| 2002/0021701 A1 | 2/2002 | Lavian | |
| 2002/0027885 A1 | 3/2002 | Ben-Ami | |
| 2002/0039350 A1 | 4/2002 | Wang | |
| 2002/0054593 A1 | 5/2002 | Morohashi | |
| 2002/0087723 A1 | 7/2002 | Williams | |
| 2002/0091795 A1 | 7/2002 | Yip | |
| 2003/0026290 A1 | 2/2003 | Umayabashi | |
| 2003/0041085 A1 | 2/2003 | Sato | |
| 2003/0097470 A1 | 5/2003 | Lapuh | |
| 2003/0123393 A1 | 7/2003 | Feuerstraeter | |
| 2003/0152075 A1 * | 8/2003 | Hawthorne, III | H04L 12/4641 370/389 |

(56) References Cited

U.S. PATENT DOCUMENTS

| | | |
|---|---|---|
| 2003/0174706 A1 | 9/2003 | Shankar |
| 2003/0189905 A1 | 10/2003 | Lee |
| 2003/0216143 A1 | 11/2003 | Roese |
| 2004/0001433 A1 | 1/2004 | Gram |
| 2004/0003094 A1 | 1/2004 | See |
| 2004/0010600 A1 | 1/2004 | Baldwin |
| 2004/0049699 A1 | 3/2004 | Griffith |
| 2004/0057430 A1 | 3/2004 | Paavolainen |
| 2004/0117508 A1 | 6/2004 | Shimizu |
| 2004/0120326 A1 | 6/2004 | Yoon |
| 2004/0156313 A1 | 8/2004 | Hofmeister et al. |
| 2004/0165595 A1 | 8/2004 | Holmgren |
| 2004/0165596 A1 | 8/2004 | Garcia |
| 2004/0213232 A1 | 10/2004 | Regan |
| 2004/0225725 A1 | 11/2004 | Enomoto |
| 2005/0007951 A1 | 1/2005 | Lapuh |
| 2005/0025179 A1 | 2/2005 | McLaggan |
| 2005/0044199 A1 | 2/2005 | Shiga |
| 2005/0074001 A1 | 4/2005 | Mattes |
| 2005/0094568 A1 | 5/2005 | Judd |
| 2005/0094630 A1 | 5/2005 | Valdevit |
| 2005/0111352 A1 | 5/2005 | Ho |
| 2005/0122979 A1 | 6/2005 | Gross |
| 2005/0152335 A1 | 7/2005 | Lodha |
| 2005/0157645 A1 | 7/2005 | Rabie et al. |
| 2005/0157751 A1 | 7/2005 | Rabie |
| 2005/0169188 A1 | 8/2005 | Cometto |
| 2005/0195813 A1 | 9/2005 | Ambe |
| 2005/0207423 A1 | 9/2005 | Herbst |
| 2005/0213561 A1 | 9/2005 | Yao |
| 2005/0220096 A1 | 10/2005 | Friskney |
| 2005/0265330 A1 | 12/2005 | Suzuki |
| 2005/0265356 A1 | 12/2005 | Kawarai |
| 2005/0278565 A1 | 12/2005 | Frattura |
| 2006/0007869 A1 | 1/2006 | Hirota |
| 2006/0018302 A1 | 1/2006 | Ivaldi |
| 2006/0023707 A1 | 2/2006 | Makishima et al. |
| 2006/0034292 A1 | 2/2006 | Wakayama |
| 2006/0039366 A1 | 2/2006 | Ghosh |
| 2006/0059163 A1 | 3/2006 | Frattura |
| 2006/0062187 A1 | 3/2006 | Rune |
| 2006/0072550 A1 | 4/2006 | Davis |
| 2006/0083254 A1 | 4/2006 | Ge |
| 2006/0092860 A1* | 5/2006 | Higashitaniguchi .... H04L 41/12 370/255 |
| 2006/0098589 A1 | 5/2006 | Kreeger |
| 2006/0126511 A1 | 6/2006 | Youn |
| 2006/0140130 A1 | 6/2006 | Kalkunte |
| 2006/0155828 A1 | 7/2006 | Ikeda |
| 2006/0168109 A1 | 7/2006 | Warmenhoven |
| 2006/0184937 A1 | 8/2006 | Abels |
| 2006/0221960 A1 | 10/2006 | Borgione |
| 2006/0235995 A1 | 10/2006 | Bhatia |
| 2006/0242311 A1 | 10/2006 | Mai |
| 2006/0245439 A1 | 11/2006 | Sajassi |
| 2006/0251067 A1 | 11/2006 | DeSanti |
| 2006/0256767 A1 | 11/2006 | Suzuki |
| 2006/0265515 A1 | 11/2006 | Shiga |
| 2006/0285499 A1 | 12/2006 | Tzeng |
| 2006/0291388 A1 | 12/2006 | Amdahl |
| 2007/0036178 A1 | 2/2007 | Hares |
| 2007/0061817 A1 | 3/2007 | Atkinson |
| 2007/0083625 A1 | 4/2007 | Chamdani |
| 2007/0086362 A1 | 4/2007 | Kato |
| 2007/0094464 A1 | 4/2007 | Sharma |
| 2007/0097968 A1 | 5/2007 | Du |
| 2007/0098006 A1 | 5/2007 | Parry |
| 2007/0116224 A1 | 5/2007 | Burke |
| 2007/0116422 A1 | 5/2007 | Reynolds |
| 2007/0121617 A1 | 5/2007 | Kanekar |
| 2007/0156659 A1 | 7/2007 | Lim |
| 2007/0177525 A1 | 8/2007 | Wijnands |
| 2007/0177597 A1 | 8/2007 | Ju |
| 2007/0183313 A1* | 8/2007 | Narayanan ............ H04L 49/357 370/216 |
| 2007/0206762 A1 | 9/2007 | Chandra |
| 2007/0211712 A1 | 9/2007 | Fitch |
| 2007/0226214 A1 | 9/2007 | Smits |
| 2007/0230472 A1 | 10/2007 | Jesuraj |
| 2007/0258449 A1 | 11/2007 | Bennett |
| 2007/0274234 A1 | 11/2007 | Kubota |
| 2007/0289017 A1 | 12/2007 | Copeland, III |
| 2008/0052487 A1 | 2/2008 | Akahane |
| 2008/0056300 A1 | 3/2008 | Williams |
| 2008/0065760 A1 | 3/2008 | Damm |
| 2008/0080517 A1 | 4/2008 | Roy |
| 2008/0095160 A1 | 4/2008 | Yadav |
| 2008/0101386 A1 | 5/2008 | Gray |
| 2008/0112400 A1 | 5/2008 | Dunbar et al. |
| 2008/0133760 A1 | 6/2008 | Berkvens |
| 2008/0159260 A1 | 7/2008 | Vobbilisetty |
| 2008/0159277 A1 | 7/2008 | Vobbilisetty |
| 2008/0172492 A1 | 7/2008 | Raghunath |
| 2008/0181196 A1 | 7/2008 | Regan |
| 2008/0181243 A1 | 7/2008 | Vobbilisetty |
| 2008/0186968 A1 | 8/2008 | Farinacci |
| 2008/0186981 A1 | 8/2008 | Seto |
| 2008/0205377 A1 | 8/2008 | Chao |
| 2008/0219172 A1 | 9/2008 | Mohan |
| 2008/0225852 A1 | 9/2008 | Raszuk |
| 2008/0225853 A1 | 9/2008 | Melman |
| 2008/0228897 A1 | 9/2008 | Ko |
| 2008/0240129 A1 | 10/2008 | Elmeleegy |
| 2008/0267179 A1 | 10/2008 | LaVigne |
| 2008/0285458 A1 | 11/2008 | Lysne |
| 2008/0285555 A1 | 11/2008 | Ogasahara |
| 2008/0298248 A1 | 12/2008 | Roeck |
| 2008/0304498 A1 | 12/2008 | Jorgensen |
| 2008/0304519 A1 | 12/2008 | Koenen |
| 2008/0310342 A1 | 12/2008 | Kruys |
| 2009/0022069 A1 | 1/2009 | Khan |
| 2009/0037607 A1 | 2/2009 | Farinacci |
| 2009/0037977 A1 | 2/2009 | Gai |
| 2009/0041046 A1 | 2/2009 | Hirata |
| 2009/0042270 A1 | 2/2009 | Dolly |
| 2009/0044270 A1 | 2/2009 | Shelly |
| 2009/0067422 A1 | 3/2009 | Poppe |
| 2009/0067442 A1 | 3/2009 | Killian |
| 2009/0079560 A1 | 3/2009 | Fries |
| 2009/0080345 A1 | 3/2009 | Gray |
| 2009/0083445 A1 | 3/2009 | Ganga |
| 2009/0092042 A1 | 4/2009 | Yuhara |
| 2009/0092043 A1 | 4/2009 | Lapuh |
| 2009/0106405 A1 | 4/2009 | Mazarick |
| 2009/0116381 A1 | 5/2009 | Kanda |
| 2009/0129384 A1 | 5/2009 | Regan |
| 2009/0138577 A1 | 5/2009 | Casado |
| 2009/0138752 A1 | 5/2009 | Graham |
| 2009/0161584 A1 | 6/2009 | Guan |
| 2009/0161670 A1 | 6/2009 | Shepherd |
| 2009/0168647 A1 | 7/2009 | Holness |
| 2009/0199177 A1 | 8/2009 | Edwards |
| 2009/0204965 A1 | 8/2009 | Tanaka |
| 2009/0213783 A1 | 8/2009 | Moreton |
| 2009/0222879 A1 | 9/2009 | Kostal |
| 2009/0225752 A1 | 9/2009 | Mitsumori |
| 2009/0232031 A1 | 9/2009 | Vasseur |
| 2009/0245137 A1 | 10/2009 | Hares et al. |
| 2009/0245242 A1 | 10/2009 | Carlson |
| 2009/0252049 A1 | 10/2009 | Ludwig |
| 2009/0252061 A1 | 10/2009 | Small |
| 2009/0260083 A1 | 10/2009 | Szeto |
| 2009/0279558 A1 | 11/2009 | Davis |
| 2009/0292858 A1 | 11/2009 | Lambeth |
| 2009/0316721 A1 | 12/2009 | Kanda |
| 2009/0323708 A1 | 12/2009 | Ihle |
| 2009/0327392 A1 | 12/2009 | Tripathi |
| 2009/0327462 A1 | 12/2009 | Adams |
| 2009/0328392 | 12/2009 | Tripathi |
| 2010/0027420 A1 | 2/2010 | Smith |
| 2010/0046471 A1 | 2/2010 | Hattori |
| 2010/0054260 A1 | 3/2010 | Pandey |
| 2010/0061269 A1 | 3/2010 | Banerjee |
| 2010/0074175 A1 | 3/2010 | Banks |

(56) References Cited

U.S. PATENT DOCUMENTS

| | | |
|---|---|---|
| 2010/0085981 A1 | 4/2010 | Gupta |
| 2010/0097941 A1 | 4/2010 | Carlson |
| 2010/0103813 A1 | 4/2010 | Allan |
| 2010/0103939 A1 | 4/2010 | Carlson |
| 2010/0131636 A1 | 5/2010 | Suri |
| 2010/0158024 A1 | 6/2010 | Sajassi |
| 2010/0165877 A1 | 7/2010 | Shukla |
| 2010/0165995 A1 | 7/2010 | Mehta |
| 2010/0168467 A1 | 7/2010 | Johnston |
| 2010/0169467 A1 | 7/2010 | Shukla |
| 2010/0169948 A1 | 7/2010 | Budko |
| 2010/0182920 A1 | 7/2010 | Matsuoka |
| 2010/0189119 A1 | 7/2010 | Sawada |
| 2010/0195529 A1 | 8/2010 | Liu |
| 2010/0215049 A1 | 8/2010 | Raza |
| 2010/0220724 A1 | 9/2010 | Rabie |
| 2010/0226368 A1 | 9/2010 | Mack-Crane |
| 2010/0226381 A1 | 9/2010 | Mehta |
| 2010/0246388 A1* | 9/2010 | Gupta et al. ............... 370/225 |
| 2010/0257263 A1 | 10/2010 | Casado |
| 2010/0258263 A1 | 10/2010 | Douxchamps |
| 2010/0271960 A1 | 10/2010 | Krygowski |
| 2010/0272107 A1 | 10/2010 | Papp |
| 2010/0281106 A1 | 11/2010 | Ashwood-Smith |
| 2010/0284414 A1 | 11/2010 | Agarwal |
| 2010/0284418 A1 | 11/2010 | Gray |
| 2010/0287262 A1 | 11/2010 | Elzur |
| 2010/0287548 A1 | 11/2010 | Zhou |
| 2010/0290464 A1 | 11/2010 | Assarpour |
| 2010/0290472 A1 | 11/2010 | Raman |
| 2010/0290473 A1 | 11/2010 | Enduri |
| 2010/0299527 A1 | 11/2010 | Arunan |
| 2010/0303071 A1 | 12/2010 | Kotalwar |
| 2010/0303075 A1 | 12/2010 | Tripathi |
| 2010/0303083 A1 | 12/2010 | Belanger |
| 2010/0309820 A1 | 12/2010 | Rajagopalan |
| 2010/0309912 A1 | 12/2010 | Mehta |
| 2010/0316055 A1* | 12/2010 | Belanger ............ H04L 49/1523 370/396 |
| 2010/0329110 A1 | 12/2010 | Rose |
| 2010/0329265 A1 | 12/2010 | Lapuh |
| 2011/0019678 A1 | 1/2011 | Mehta |
| 2011/0032945 A1 | 2/2011 | Mullooly |
| 2011/0035489 A1 | 2/2011 | McDaniel |
| 2011/0035498 A1 | 2/2011 | Shah |
| 2011/0044339 A1 | 2/2011 | Kotalwar |
| 2011/0044352 A1 | 2/2011 | Chaitou |
| 2011/0051723 A1 | 3/2011 | Rabie |
| 2011/0055274 A1 | 3/2011 | Scales et al. |
| 2011/0058547 A1 | 3/2011 | Waldrop |
| 2011/0064086 A1 | 3/2011 | Xiong |
| 2011/0064089 A1 | 3/2011 | Hidaka |
| 2011/0072208 A1 | 3/2011 | Gulati |
| 2011/0085560 A1 | 4/2011 | Chawla |
| 2011/0085562 A1 | 4/2011 | Bao |
| 2011/0085563 A1 | 4/2011 | Kotha |
| 2011/0110266 A1 | 5/2011 | Li |
| 2011/0134802 A1 | 6/2011 | Rajagopalan |
| 2011/0134803 A1 | 6/2011 | Dalvi |
| 2011/0134924 A1* | 6/2011 | Hewson ............ H04L 12/4625 370/392 |
| 2011/0134925 A1 | 6/2011 | Safrai |
| 2011/0142053 A1 | 6/2011 | Van Der Merwe et al. |
| 2011/0142062 A1 | 6/2011 | Wang |
| 2011/0161494 A1 | 6/2011 | McDysan |
| 2011/0161695 A1 | 6/2011 | Okita |
| 2011/0188373 A1 | 8/2011 | Saito |
| 2011/0194403 A1* | 8/2011 | Sajassi ................ H04L 12/462 370/217 |
| 2011/0194563 A1 | 8/2011 | Shen |
| 2011/0225540 A1 | 9/2011 | d'Entremont |
| 2011/0228780 A1 | 9/2011 | Ashwood-Smith |
| 2011/0231570 A1 | 9/2011 | Altekar |
| 2011/0231574 A1 | 9/2011 | Saunderson |
| 2011/0235523 A1 | 9/2011 | Jha |
| 2011/0243133 A9 | 10/2011 | Villait |
| 2011/0243136 A1 | 10/2011 | Raman |
| 2011/0246669 A1 | 10/2011 | Kanada |
| 2011/0255538 A1 | 10/2011 | Srinivasan |
| 2011/0255540 A1 | 10/2011 | Mizrahi |
| 2011/0261828 A1 | 10/2011 | Smith |
| 2011/0268120 A1* | 11/2011 | Vobbilisetty et al. ......... 370/392 |
| 2011/0268125 A1 | 11/2011 | Vobbilisetty |
| 2011/0273988 A1 | 11/2011 | Tourrilhes |
| 2011/0274114 A1 | 11/2011 | Dhar |
| 2011/0280572 A1* | 11/2011 | Vobbilisetty ............ H04L 49/70 398/45 |
| 2011/0286357 A1* | 11/2011 | Haris .................... H04L 12/462 370/254 |
| 2011/0286457 A1 | 11/2011 | Ee |
| 2011/0296052 A1 | 12/2011 | Guo |
| 2011/0299391 A1 | 12/2011 | Vobbilisetty |
| 2011/0299413 A1 | 12/2011 | Chatwani |
| 2011/0299414 A1 | 12/2011 | Yu |
| 2011/0299527 A1 | 12/2011 | Yu |
| 2011/0299528 A1 | 12/2011 | Yu |
| 2011/0299531 A1 | 12/2011 | Yu |
| 2011/0299532 A1 | 12/2011 | Yu |
| 2011/0299533 A1 | 12/2011 | Yu |
| 2011/0299534 A1 | 12/2011 | Koganti |
| 2011/0299535 A1 | 12/2011 | Vobbilisetty |
| 2011/0299536 A1 | 12/2011 | Cheng |
| 2011/0317559 A1 | 12/2011 | Kern |
| 2011/0317703 A1 | 12/2011 | Dunbar et al. |
| 2012/0011240 A1 | 1/2012 | Hara |
| 2012/0014261 A1 | 1/2012 | Salam |
| 2012/0014387 A1 | 1/2012 | Dunbar |
| 2012/0020220 A1 | 1/2012 | Sugita |
| 2012/0027017 A1 | 2/2012 | Rai |
| 2012/0033663 A1 | 2/2012 | Guichard |
| 2012/0033665 A1 | 2/2012 | Jacob |
| 2012/0033669 A1 | 2/2012 | Mohandas |
| 2012/0039163 A1 | 2/2012 | Nakajima |
| 2012/0075991 A1 | 3/2012 | Sugita |
| 2012/0099567 A1 | 4/2012 | Hart |
| 2012/0099602 A1 | 4/2012 | Nagapudi |
| 2012/0106339 A1 | 5/2012 | Mishra |
| 2012/0131097 A1 | 5/2012 | Baykal |
| 2012/0131289 A1 | 5/2012 | Taguchi |
| 2012/0136999 A1 | 5/2012 | Roitshtein |
| 2012/0147740 A1 | 6/2012 | Nakash |
| 2012/0158997 A1 | 6/2012 | Hsu |
| 2012/0163164 A1 | 6/2012 | Terry |
| 2012/0170491 A1 | 7/2012 | Kern |
| 2012/0177039 A1 | 7/2012 | Berman |
| 2012/0230225 A1 | 9/2012 | Matthews |
| 2012/0243359 A1 | 9/2012 | Katoch |
| 2012/0243539 A1 | 9/2012 | Keesara |
| 2012/0250502 A1 | 10/2012 | Brolin |
| 2012/0275347 A1 | 11/2012 | Banerjee |
| 2012/0281700 A1* | 11/2012 | Koganti .................. H04L 49/60 370/392 |
| 2012/0287785 A1 | 11/2012 | Kamble |
| 2012/0294192 A1 | 11/2012 | Masood |
| 2012/0294194 A1 | 11/2012 | Balasubramanian |
| 2012/0320800 A1 | 12/2012 | Kamble |
| 2012/0320926 A1 | 12/2012 | Kamath et al. |
| 2012/0327766 A1 | 12/2012 | Tsai et al. |
| 2012/0327937 A1 | 12/2012 | Melman et al. |
| 2013/0003535 A1 | 1/2013 | Sarwar |
| 2013/0003549 A1 | 1/2013 | Matthews |
| 2013/0003608 A1* | 1/2013 | Lei ........................ H04L 12/462 370/256 |
| 2013/0003737 A1 | 1/2013 | Sinicrope |
| 2013/0003738 A1 | 1/2013 | Koganti |
| 2013/0028072 A1 | 1/2013 | Addanki |
| 2013/0034015 A1 | 2/2013 | Jaiswal |
| 2013/0034094 A1 | 2/2013 | Cardona |
| 2013/0044629 A1* | 2/2013 | Biswas ................ H04L 67/2804 370/254 |
| 2013/0058354 A1 | 3/2013 | Casado |
| 2013/0067466 A1 | 3/2013 | Combs |
| 2013/0070762 A1 | 3/2013 | Adams |
| 2013/0083693 A1 | 4/2013 | Himura |

(56) References Cited

U.S. PATENT DOCUMENTS

| | | | |
|---|---|---|---|
| 2013/0097345 A1 | 4/2013 | Munoz | |
| 2013/0114595 A1 | 5/2013 | Mack-Crane et al. | |
| 2013/0124707 A1 | 5/2013 | Ananthapadmanabha | |
| 2013/0124750 A1* | 5/2013 | Anumala | H04L 12/4625 709/232 |
| 2013/0127848 A1 | 5/2013 | Joshi | |
| 2013/0145008 A1* | 6/2013 | Kannan | H04L 45/586 709/223 |
| 2013/0194914 A1 | 8/2013 | Agarwal | |
| 2013/0219473 A1 | 8/2013 | Schaefer | |
| 2013/0223221 A1 | 8/2013 | Xu | |
| 2013/0250951 A1 | 9/2013 | Koganti | |
| 2013/0250958 A1 | 9/2013 | Watanabe | |
| 2013/0259037 A1 | 10/2013 | Natarajan | |
| 2013/0266015 A1* | 10/2013 | Qu | H04L 49/70 370/392 |
| 2013/0272135 A1 | 10/2013 | Leong | |
| 2013/0294451 A1* | 11/2013 | Li | H04L 45/66 370/392 |
| 2013/0301425 A1 | 11/2013 | Udutha | |
| 2013/0301642 A1* | 11/2013 | Radhakrishnan et al. | 370/392 |
| 2013/0315125 A1 | 11/2013 | Ravishankar | |
| 2013/0322427 A1 | 12/2013 | Stiekes | |
| 2014/0044126 A1 | 2/2014 | Sabhanatarajan | |
| 2014/0059225 A1 | 2/2014 | Gasparakis | |
| 2014/0071987 A1* | 3/2014 | Janardhanan | H04L 45/66 370/390 |
| 2014/0086253 A1 | 3/2014 | Yong | |
| 2014/0105034 A1 | 4/2014 | Sun | |
| 2014/0112122 A1 | 4/2014 | Kapadia | |
| 2014/0140243 A1 | 5/2014 | Ashwood-Smith | |
| 2014/0241147 A1 | 8/2014 | Rajagopalan | |
| 2014/0258446 A1 | 9/2014 | Bursell | |
| 2014/0269701 A1* | 9/2014 | Kaushik | H04L 45/586 370/390 |
| 2014/0269720 A1 | 9/2014 | Srinivasan | |
| 2014/0269733 A1 | 9/2014 | Venkatesh | |
| 2014/0355477 A1 | 12/2014 | Velayudhan | |
| 2015/0009992 A1 | 1/2015 | Zhang | |
| 2015/0110111 A1 | 4/2015 | Song | |
| 2015/0110487 A1 | 4/2015 | Fenkes | |
| 2015/0139234 A1* | 5/2015 | Hu | H04L 45/66 370/392 |
| 2015/0172098 A1 | 6/2015 | Agarwal | |
| 2015/0188753 A1 | 7/2015 | Anumala | |
| 2017/0026197 A1 | 1/2017 | Venkatesh | |

FOREIGN PATENT DOCUMENTS

| | | |
|---|---|---|
| CN | 101064682 | 10/2007 |
| CN | 101459618 | 6/2009 |
| CN | 101471899 | 7/2009 |
| CN | 101548511 | 9/2009 |
| CN | 101645880 | 2/2010 |
| CN | 102098237 | 6/2011 |
| CN | 102148749 | 8/2011 |
| CN | 102301663 | 12/2011 |
| CN | 102349268 | 2/2012 |
| CN | 102378176 | 3/2012 |
| CN | 102404181 | 4/2012 |
| CN | 102415065 | 4/2012 |
| CN | 102415065 A | 4/2012 |
| CN | 102801599 | 11/2012 |
| CN | 102801599 A | 11/2012 |
| CN | 102088388 | 4/2014 |
| EP | 0579567 | 5/1993 |
| EP | 0993156 | 4/2000 |
| EP | 1398920 | 3/2004 |
| EP | 1398920 A2 | 3/2004 |
| EP | 2001167 A1 | 8/2007 |
| EP | 1916807 A2 | 4/2008 |
| EP | 2854352 | 4/2015 |
| EP | 2874359 | 5/2015 |
| WO | 2008056838 | 5/2008 |
| WO | 2009042919 | 4/2009 |
| WO | 2010111142 | 9/2010 |
| WO | 2010111142 A1 | 9/2010 |
| WO | 2011132568 | 10/2011 |
| WO | 2011140028 | 11/2011 |
| WO | 2011140028 A1 | 11/2011 |
| WO | WO 2011140028 A1 * | 11/2011 ............ H04L 49/70 |
| WO | 2012033663 | 3/2012 |
| WO | 2012093429 | 7/2012 |
| WO | 2014031781 | 2/2014 |

OTHER PUBLICATIONS

Office action dated Apr. 30, 2015, U.S. Appl. No. 13/351,513, filed Jan. 17, 2012.
Office Action dated Apr. 1, 2015, U.S. Appl. No. 13/656,438, filed Oct. 19, 2012.
Office Action dated May 21, 2015, U.S. Appl. No. 13/288,822, filed Nov. 3, 2011.
Siamak Azodolmolky et al. "Cloud computing networking: Challenges and opportunities for innovations", IEEE Communications Magazine, vol. 51, No. 7, Jul. 1, 2013.
Office Action dated Apr. 1, 2015 U.S. Appl. No. 13/656,438, filed Oct. 19, 2012.
Office action dated Jun. 8, 2015, U.S. Appl. No. 14/178,042, filed Feb. 11, 2014.
Office Action dated Jun. 10, 2015, U.S. Appl. No. 13/890,150, filed May 8, 2013.
Eastlake, D. et al., 'RBridges: TRILL Header Options', Dec. 24, 2009, pp. 1-17, TRILL Working Group.
Perlman, Radia et al., 'RBridge VLAN Mapping', TRILL Working Group, Dec. 4, 2009, pp. 1-12.
'An Introduction to Brocade VCS Fabric Technology', Brocade white paper, http://community.brocade.com/docs/DOC-2954, Dec. 3, 2012.
'Switched Virtual Networks. Internetworking Moves Beyond Bridges and Routers' Data Communications, McGraw Hill. New York, US, vol. 23, No. 12, Sep. 1, 1994 (Sep. 1, 1994), pp. 66-70,72,74, XP000462385 ISSN: 0363-6399.
U.S. Appl. No. 13/030,806 Office Action dated Dec. 3, 2012.
Office Action dated Apr. 9, 2014, U.S. Appl. No. 13/092,724, filed Apr. 22, 2011.
Office action dated Jan. 10, 2014, U.S. Appl. No. 13/092,580, filed Apr. 22, 2011.
Office action dated Jan. 16, 2014, U.S. Appl. No. 13/042,259, filed Mar. 7, 2011.
Office action dated Jul. 31, 2013, U.S. Appl. No. 13/042,259, filed Mar. 7, 2011.
Office Action dated Mar. 14, 2014, U.S. Appl. No. 13/092,460, filed Apr. 22, 2011.
Office Action dated Mar. 26, 2014, U.S. Appl. No. 13/092,701, filed Apr. 22, 2011.
Office Action dated Apr. 9, 2014, U.S. Appl. No. 13/092,752, filed Apr. 22, 2011.
Office action dated Jan. 6, 2014, U.S. Appl. No. 13/092,877, filed Apr. 22, 2011.
Office action dated Oct. 2, 2013, U.S. Appl. No. 13/044,326, filed Mar. 9, 2011.
Office action dated Dec. 2, 2013, U.S. Appl. No. 13/184,526, filed Jul. 16, 2011.
Office action dated Nov. 29, 2013, U.S. Appl. No. 13/092,873, filed Apr. 22, 2011.
Office Action dated Mar. 6, 2014, U.S. Appl. No. 13/425,238, filed Mar. 20, 2012.
Office action dated Nov. 12, 2013, U.S. Appl. No. 13/312,903, filed Dec. 6, 2011.
Office Action dated Jun. 18, 2014, U.S. Appl. No. 13/440,861, filed Apr. 5, 2012.
Office Action dated Feb. 28, 2014, U.S. Appl. No. 13/351,513, filed Jan. 17, 2012.
Office Action dated May 9, 2014, U.S. Appl. No. 13/484,072, filed May 30, 2012.

(56) References Cited

OTHER PUBLICATIONS

Office Action dated May 14, 2014, U.S. Appl. No. 13/533,843, filed Jun. 26, 2012.
Office Action dated Feb. 20, 2014, U.S. Appl. No. 13/598,204, filed Aug. 29, 2012.
Office Action dated Jun. 6, 2014, U.S. Appl. No. 13/669,357, filed Nov. 5, 2012.
Brocade, 'Brocade Fabrics OS (FOS) 6.2 Virtual Fabrics Feature Frequently Asked Questions', pp. 1-6, 2009 Brocade Communications Systems, Inc.
Brocade, 'FastIron and TurboIron 24x Configuration Guide', Feb. 16, 2010.
Brocade, 'The Effortless Network: Hyperedge Technology for the Campus LAN' 2012.
Brocade 'Brocade Unveils 'The Effortless Network, http://newsroom.brocade.com/press-releases/brocade-unveils-the-effortless-network-nasdaq-brcd-0859535, 2012.
Christensen, M. et al., 'Considerations for Internet Group Management Protocol (IGMP) and Multicast Listener Discovery (MLD) Snooping Switches', May 2006.
FastIron Configuration Guide Supporting Ironware Software Release 07.0.00, Dec. 18, 2009.
Foundary FastIron Configuration Guide, Software Release FSX 04.2.00b, Software Release FWS 04.3.00, Software Release FGS 05.0.00a, Sep. 2008.
Huang, Nen-Fu et al., 'An Effective Spanning Tree Algorithm for a Bridged LAN', Mar. 16, 1992.
Knight, 'Network Based IP VPN Architecture using Virtual Routers', May 2003.
Knight P et al: 'Layer 2 and 3 Virtual Private Networks: Taxonomy, Technology, and Standardization Efforts', IEEE Communications Magazine, IEEE Service Center, Piscataway, US, vol. 42, No. 6, Jun. 1, 2004 (Jun. 1, 2004), pp. 124-131, XP001198207, ISSN: 0163-6804, DOI: 10.1109/MCOM.2004.1304248.
Knight S et al: 'Virtual Router Redundancy Protocol' Internet Citation Apr. 1, 1998 (Apr. 1, 1998), XP002135272 Retrieved from the Internet: URL:ftp://ftp.isi.edu/in-notes/rfc2338.txt [retrieved on Apr. 10, 2000].
Kreeger, L. et al., 'Network Virtualization Overlay Control Protocol Requirements draft-kreeger-nvo3-overlay-cp-00', Jan. 30, 2012.
Lapuh, Roger et al., 'Split Multi-link Trunking (SMLT)', draft-lapuh-network-smlt-08, Jul. 2008.
Lapuh, Roger et al., 'Split Multi-Link Trunking (SMLT)', Network Working Group, Oct. 2012.
Louati, Wajdi et al., 'Network-based virtual personal overlay networks using programmable virtual routers', IEEE Communications Magazine, Jul. 2005.
Narten, T. et al., 'Problem Statement: Overlays for Network Virtualization d raft-narten-n vo3-over I ay-problem -statement-01', Oct. 31, 2011.
Office Action for U.S. Appl. No. 13/092,752, filed Apr. 22, 2011, from Park, Jung H., dated Jul. 18, 2013.
Office Action for U.S. Appl. No. 13/365,993, filed Feb. 3, 2012, from Cho, Hong Sol., dated Jul. 23, 2013.
Office Action for U.S. Appl. No. 12/725,249, filed Mar. 16, 2010, dated Apr. 26, 2013.
Office Action for U.S. Appl. No. 12/725,249, filed Mar. 16, 2010, dated Sep. 12, 2012.
Office Action for U.S. Appl. No. 12/950,968, filed Nov. 19, 2010, dated Jan. 4, 2013.
Office Action for U.S. Appl. No. 12/950,968, filed Nov. 19, 2010, dated Jun. 7, 2012.
Office Action for U.S. Appl. No. 12/950,974, filed Nov. 19, 2010, dated Dec. 20, 2012.
Office Action for U.S. Appl. No. 12/950,974, filed Nov. 19, 2010, dated May 24, 2012.
Office Action for U.S. Appl. No. 13/030,688, filed Feb. 18, 2011, dated Apr. 25, 2013.
Office Action for U.S. Appl. No. 13/030,806, filed Feb. 18, 2011, dated Jun. 11, 2013.
Office Action for U.S. Appl. No. 13/042,259, filed Mar. 7, 2011, dated Mar. 18, 2013.
Office Action for U.S. Appl. No. 13/042,259, filed Mar. 7, 2011, dated Jul. 31, 2013.
Office Action for U.S. Appl. No. 13/044,301, filed Mar. 9, 2011, dated Feb. 22, 2013.
Office Action for U.S. Appl. No. 13/044,301, filed Mar. 9, 2011, dated Jun. 11, 2013.
Office Action for U.S. Appl. No. 13/044,326, filed Mar. 9, 2011, dated Oct. 2, 2013.
Office Action for U.S. Appl. No. 13/050,102, filed Mar. 17, 2011, dated Oct. 26, 2012.
Office Action for U.S. Appl. No. 13/050,102, filed Mar. 17, 2011, dated May 16, 2013.
Office Action for U.S. Appl. No. 13/087,239, filed Apr. 14, 2011, dated May 22, 2013.
Office Action for U.S. Appl. No. 13/092,460, filed Apr. 22, 2011, dated Jun. 21, 2013.
Office Action for U.S. Appl. No. 13/092,580, filed Apr. 22, 2011, dated Jun. 10, 2013.
Office Action for U.S. Appl. No. 13/092,701, filed Apr. 22, 2011, dated Jan. 28, 2013.
Office Action for U.S. Appl. No. 13/092,701, filed Apr. 22, 2011, dated Jul. 3, 2013.
Office Action for U.S. Appl. No. 13/092,724, filed Apr. 22, 2011, dated Feb. 5, 2013.
Office Action for U.S. Appl. No. 13/092,724, filed Apr. 22, 2011, dated Jul. 16, 2013.
Office Action for U.S. Appl. No. 13/092,752, filed Apr. 22, 2011, dated Feb. 5, 2013.
Office Action for U.S. Appl. No. 13/092,864, filed Apr. 22, 2011, dated Sep. 19, 2012.
Office Action for U.S. Appl. No. 13/092,873, filed Apr. 22, 2011, dated Jun. 19, 2013.
Office Action for U.S. Appl. No. 13/092,877, filed Apr. 22, 2011, dated Mar. 4, 2013.
Office Action for U.S. Appl. No. 13/092,877, filed Apr. 22, 2011, dated Sep. 5, 2013.
Office Action for U.S. Appl. No. 13/098,360, filed Apr. 29, 2011, dated May 31, 2013.
Office Action for U.S. Appl. No. 13/098,490, filed May 2, 2011, dated Dec. 21, 2012.
Office Action for U.S. Appl. No. 13/098,490, filed May 2, 2011, dated Jul. 9, 2013.
Office Action for U.S. Appl. No. 13/184,526, filed Jul. 16, 2011, dated Jan. 28, 2013.
Office Action for U.S. Appl. No. 13/184,526, filed Jul. 16, 2011, dated May 22, 2013.
Office Action for U.S. Appl. No. 13/365,808, filed Jul. 18, 2013, dated Jul. 18, 2013.
Office Action for U.S. Appl. No. 13/533,843, filed Jun. 26, 2012, dated Oct. 21, 2013.
Office Action for U.S. Appl. No. 13/092,887, dated Jan. 6, 2014.
Perlman, Radia et al., 'Challenges and Opportunities in the Design of TRILL: a Routed layer 2 Technology', 2009.
Perlman, Radia et al., 'RBridges: Base Protocol Specification; Draft-ietf-trill-rbridge-protocol-16.txt', Mar. 3, 2010, pp. 1-117.
S. Nadas et al., 'Virtual Router Redundancy Protocol (VRRP) Version 3 for IPv4 and IPv6', Internet Engineering Task Force, Mar. 2010.
'RBridges: Base Protocol Specification', IETF Draft, Perlman et al., Jun. 26, 2009.
Office action dated Aug. 29, 2014, U.S. Appl. No. 13/042,259, filed Mar. 7, 2011.
Office action dated Aug. 21, 2014, U.S. Appl. No. 13/184,526, filed Jul. 16, 2011.
Brocade 'An Introduction to Brocade VCS Fabric Technology', Dec. 3, 2012.
Office Action for U.S. Appl. No. 13/042,259, filed Mar. 7, 2011, from Jaroenchonwanit, Bunjob, dated Jan. 16, 2014.
Office Action for U.S. Appl. No. 13/030,806, filed Feb. 18, 2011, dated Dec. 3, 2012.

(56) References Cited

OTHER PUBLICATIONS

Office Action for U.S. Appl. No. 13/098,490, filed May 2, 2011, dated Mar. 27, 2014.
Office Action for U.S. Appl. No. 13/312,903, filed Dec. 6, 2011, dated Jun. 13, 2013.
Office Action for U.S. Appl. No. 13/092,873, filed Apr. 22, 2011, dated Nov. 29, 2013.
Office Action for U.S. Appl. No. 13/184,526, filed Jul. 16, 2011, dated Dec. 2, 2013.
Office Action for U.S. Appl. No. 13/598,204, filed Aug. 29, 2012, dated Feb. 20, 2014.
Office action dated Apr. 26, 2012, U.S. Appl. No. 12/725,249, filed Mar. 16, 2010.
Office action dated Sep. 12, 2012, U.S. Appl. No. 12/725,249, filed Mar. 16, 2010.
Office action dated Dec. 21, 2012, U.S. Appl. No. 13/098,490, filed May 2, 2011.
Office action dated Mar. 27, 2014, U.S. Appl. No. 13/098,490, filed May 2, 2011.
Office action dated Jul. 9, 2013, U.S. Appl. No. 13/098,490, filed May 2, 2011.
Office action dated May 22, 2013, U.S. Appl. No. 13/087,239, filed Apr. 14, 2011.
Office action dated Dec. 5, 2012, U.S. Appl. No. 13/087,239, filed Apr. 14, 2011.
Office action dated Feb. 5, 2013, U.S. Appl. No. 13/092,724, filed Apr. 22, 2011.
Office action dated Jun. 10, 2013, U.S. Appl. No. 13/092,580, filed Apr. 22, 2011.
Office action dated Mar. 18, 2013, U.S. Appl. No. 13/042,259, filed Mar. 7, 2011.
Office action dated Jun. 21, 2013, U.S. Appl. No. 13/092,460, filed Apr. 22, 2011.
Office action dated Jan. 28, 2013, U.S. Appl. No. 13/092,701, filed Apr. 22, 2011.
Office action dated Jul. 3, 2013, U.S. Appl. No. 13/092,701, filed Apr. 22, 2011.
Office action dated Jul. 18, 2013, U.S. Appl. No. 13/092,752, filed Apr. 22, 2011.
Office action dated Dec. 20, 2012, U.S. Appl. No. 12/950,974, filed Nov. 19, 2010.
Office action dated May 24, 2012, U.S. Appl. No. 12/950,974, filed Nov. 19, 2010.
Office action dated Sep. 5, 2013, U.S. Appl. No. 13/092,877, filed Apr. 22, 2011.
Office action dated Mar. 4, 2013, U.S. Appl. No. 13/092,877, filed Apr. 22, 2011.
Office action dated Jan. 4, 2013, U.S. Appl. No. 12/950,968, filed Nov. 19, 2010.
Office action dated Jun. 7, 2012, U.S. Appl. No. 12/950,968, filed Nov. 19, 2010.
Office action dated Sep. 19, 2012, U.S. Appl. No. 13/092,864, filed Apr. 22, 2011.
Office action dated May 31, 2013, U.S. Appl. No. 13/098,360, filed Apr. 29, 2011.
Office action dated Dec. 3, 2012, U.S. Appl. No. 13/030,806, filed Feb. 18, 2011.
Office action dated Apr. 22, 2014, U.S. Appl. No. 13/030,806, filed Feb. 18, 2011.
Office action dated Jun. 11, 2013, U.S. Appl. No. 13/030,806, filed Feb. 18, 2011.
Office action dated Apr. 25, 2013, U.S. Appl. No. 13/030,688, filed Feb. 18, 2011.
Office action dated Feb. 22, 2013, U.S. Appl. No. 13/044,301, filed Mar. 9, 2011.
Office action dated Jun. 11, 2013, U.S. Appl. No. 13/044,301, filed Mar. 9, 2011.
Office action dated Oct. 26, 2012, U.S. Appl. No. 13/050,102, filed Mar. 17, 2011.
Office action dated May 16, 2013, U.S. Appl. No. 13/050,102, filed Mar. 17, 2011.
Office action dated Aug. 4, 2014, U.S. Appl. No. 13/050,102, filed Mar. 17, 2011.
Office action dated Jan. 28, 2013, U.S. Appl. No. 13/148,526, filed Jul. 16, 2011.
Office action dated May 22, 2013, U.S. Appl. No. 13/148,526, filed Jul. 16, 2011.
Office action dated Jun. 19, 2013, U.S. Appl. No. 13/092,873, filed Apr. 22, 2011.
Office action dated Jul. 18, 2013, U.S. Appl. No. 13/365,808, filed Feb. 3, 2012.
Office action dated Jun. 13, 2013, U.S. Appl. No. 13/312,903, filed Dec. 6, 2011.
Lapuh, Roger et al., 'Split Multi-link Trunking (SMLT) draft-lapuh-network-smlt-08', Jan. 2009.
Office Action for U.S. Appl. No. 13/030,688, filed Feb. 18, 2011, dated Jul. 17, 2014.
Office Action for U.S. Appl. No. 13/044,326, filed Mar. 9, 2011, dated Jul. 7, 2014.
Office Action for U.S. Appl. No. 13/092,752, filed Apr. 22, 2011, dated Apr. 9, 2014.
Office Action for U.S. Appl. No. 13/092,873, filed Apr. 22, 2011, dated Jul. 25, 2014.
Office Action for U.S. Appl. No. 13/092,877, filed Apr. 22, 2011, dated Jun. 20, 2014.
Office Action for U.S. Appl. No. 13/312,903, filed Dec. 6, 2011, dated Aug. 7, 2014.
Office Action for U.S. Appl. No. 13/351,513, filed Jan. 17, 2012, dated Jul. 24, 2014.
Office Action for U.S. Appl. No. 13/425,238, filed Mar. 20, 2012, dated Mar. 6, 2014.
Office Action for U.S. Appl. No. 13/556,061, filed Jul. 23, 2012, dated Jun. 6, 2014.
Office Action for U.S. Appl. No. 13/742,207 dated Jul. 24, 2014, filed Jan. 15, 2013.
Office Action for U.S. Appl. No. 13/950,974, filed Nov. 19, 2010, from Haile, Awet A., dated Dec. 2, 2012.
Office Action for U.S. Appl. No. 13/087,239, filed Apr. 14, 2011, dated Dec. 5, 2012.
Office Action for U.S. Appl. No. 13/351,513, filed Jan. 17, 2012, dated Feb. 28, 2014.
Perlman R: 'Challenges and opportunities in the design of TRILL: a routed layer 2 technology', 2009 IEEE Globecom Workshops, Honolulu, HI, USA, Piscataway, NJ, USA, Nov. 30, 2009 (Nov. 30, 2009), pp. 1-6, XP002649647, DOI: 10.1109/GLOBECOM.2009. 5360776 ISBN: 1-4244-5626-0 [retrieved on Jul. 19, 2011].
TRILL Working Group Internet-Draft Intended status: Proposed Standard RBridges: Base Protocol Specificaiton Mar. 3, 2010.
Office action dated Aug. 14, 2014, U.S. Appl. No. 13/092,460, filed Apr. 22, 2011.
Office action dated Jul. 7, 2014, for U.S. Appl. No. 13/044,326, filed Mar. 9, 2011.
Office Action dated Dec. 19, 2014, for U.S. Appl. No. 13/044,326, filed Mar. 9, 2011.
Office Action for U.S. Appl. No. 13/092,873, filed Apr. 22, 2011, dated Nov. 7, 2014.
Office Action for U.S. Appl. No. 13/092,877, filed Apr. 22, 2011, dated Nov. 10, 2014.
Office Action for U.S. Appl. No. 13/157,942, filed Jun. 10, 2011.
Mckeown, Nick et al. "OpenFlow: Enabling Innovation in Campus Networks", Mar. 14, 2008, www.openflow.org/documents/openflow-wp-latest.pdf.
Office Action for U.S. Appl. No. 13/044,301, dated Mar. 9, 2011.
Office Action for U.S. Appl. No. 13/184,526, filed Jul. 16, 2011, dated Jan. 5, 2015.
Office Action for U.S. Appl. No. 13/598,204, filed Aug. 29, 2012, dated Jan. 5, 2015.
Office Action for U.S. Appl. No. 13/669,357, filed Nov. 5, 2012, dated Jan. 30, 2015.
Office Action for U.S. Appl. No. 13/851,026, filed Mar. 26, 2013, dated Jan. 30, 2015.

(56) References Cited

OTHER PUBLICATIONS

Office Action for U.S. Appl. No. 13/786,328, filed Mar. 5, 2013, dated Mar. 13, 2015.
Office Action for U.S. Appl. No. 13/092,460, filed Apr. 22, 2011, dated Mar. 13, 2015.
Office Action for U.S. Appl. No. 13/425,238, dated Mar. 12, 2015.
Office Action for U.S. Appl. No. 13/092,752, filed Apr. 22, 2011, dated Feb. 27, 2015.
Office Action for U.S. Appl. No. 13/042,259, filed Mar. 7, 2011, dated Feb. 23, 2015.
Office Action for U.S. Appl. No. 13/044,301, filed Mar. 9, 2011, dated Jan. 29, 2015.
Office Action for U.S. Appl. No. 13/050,102, filed Mar. 17, 2011, dated Jan. 26, 2015.
Office action dated Oct. 2, 2014, for U.S. Appl. No. 13/092,752, filed Apr. 22, 2011.
Kompella, Ed K. et al., 'Virtual Private LAN Service (VPLS) Using BGP for Auto-Discovery and Signaling' Jan. 2007.
Rosen, E. et al., "BGP/MPLS VPNs", Mar. 1999.
Office Action for U.S. Appl. No. 14/577,785, filed Dec. 19, 2014, dated Apr. 13, 2015.
Office Action for U.S. Appl. No. 13/425,238, filed Mar. 20, 2012, dated Mar. 12, 2015.
Abawajy J. "An Approach to Support a Single Service Provider Address Image for Wide Area Networks Environment" Centre for Parallel and Distributed Computing, School of Computer Science Carleton University, Ottawa, Ontario, K1S 5B6, Canada.
Office Action dated Jun. 18, 2015, U.S. Appl. No. 13/098,490, filed May 2, 2011.
Office Action dated Jun. 16, 2015, U.S. Appl. No. 13/048,817, filed Mar. 15, 2011.
Touch, J. et al., 'Transparent Interconnection of Lots of Links (TRILL): Problem and Applicability Statement', May 2009, Network Working Group, pp. 1-17.
Zhai F. Hu et al. 'RBridge: Pseudo-Nickname; draft-hu-trill-pseudonode-nickname-02.txt', May 15, 2012.
Office Action dated Jul. 31, 2015, U.S. Appl. No. 13/598,204, filed Aug. 29, 2014.
Office Action dated Jul. 31, 2015, U.S. Appl. No. 14/473,941, filed Aug. 29, 2014.
Office Action dated Jul. 31, 2015, U.S. Appl. No. 14/488,173, filed Sep. 16, 2014.
Office Action dated Aug. 21, 2015, U.S. Appl. No. 13/776,217, filed Feb. 25, 2013.
Office Action dated Aug. 19, 2015, U.S. Appl. No. 14/156,374, filed Jan. 15, 2014.
Office Action dated Sep. 2, 2015, U.S. Appl. No. 14/151,693, filed Jan. 9, 2014.
Office Action dated Sep. 17, 2015, U.S. Appl. No. 14/577,785, filed Dec. 19, 2014.
Office Action dated Sep. 22, 2015 U.S. Appl. No. 13/656,438, filed Oct. 19, 2012.
Office Action dated Nov. 5, 2015, U.S. Appl. No. 14/178,042, filed Feb. 11, 2014.
Office Action dated Oct. 19, 2015, U.S. Appl. No. 14/215,996, filed Mar. 17, 2014.
Office Action dated Sep. 18, 2015, U.S. Appl. No. 13/345,566, filed Jan. 6, 2012.
Office Action for U.S. Appl. No. 14/660,803, dated May 17, 2017.
Office Action for U.S. Appl. No. 14/488,173, dated May 12, 2017.
Office Action for U.S. Appl. No. 13/288,822, dated May 26, 2017.
Office Action for U.S. Appl. No. 14/329,447, dated Jun. 8, 2017.
Office Action dated Jan. 31, 2017, U.S. Appl. No. 13/184,526, filed Jul. 16, 2011.
Office Action dated Jan. 27, 2017, U.S. Appl. No. 14/216,292, filed Mar. 17, 2014.
Office Action dated Jan. 26, 2017, U.S. Appl. No. 13/786,328, filed Mar. 5, 2013.
Office Action dated Dec. 2, 2016, U.S. Appl. No. 14/512,268, filed Oct. 10, 2014.
Office Action dated Dec. 1, 2016, U.S. Appl. No. 13/899,849, filed May 22, 2013.
Office Action dated Dec. 1, 2016, U.S. Appl. No. 13/656,438, filed Oct. 19, 2012.
Office Action dated Nov. 30, 2016, U.S. Appl. No. 13/598,204, filed Aug. 29, 2012.
Office Action dated Nov. 21, 2016, U.S. Appl. No. 13/669,357, filed Nov. 5, 2012.
Office Action dated Feb. 8, 2017, U.S. Appl. No. 14/473,941, filed Aug. 29, 2014.
Office Action dated Feb. 8, 2017, U.S. Appl. No. 14/822,380, filed Aug. 10, 2015.
"Network based IP VPN Architecture using Virtual Routers" Paul Knight et al.
Yang Yu et al "A Framework of using OpenFlow to handle transient link failure", TMEE, 2011 International Conference on, IEEE, Dec. 16, 2011.
Office Action for U.S. Appl. No. 15/227,789, dated Feb. 27, 2017.
Office Action for U.S. Appl. No. 14/822,380, dated Feb. 8, 2017.
Office Action for U.S. Appl. No. 14/704,660, dated Feb. 27, 2017.
Office Action for U.S. Appl. No. 14/510,913, dated Mar. 3, 2017.
Office Action for U.S. Appl. No. 14/473,941, dated Feb. 8, 2017.
Office Action for U.S. Appl. No. 14/329,447, dated Feb. 10, 2017.
Office Action for U.S. Appl. No. 14/662,095, dated Mar. 24, 2017.
Office Action for U.S. Appl. No. 15/005,967, dated Mar. 31, 2017.
Office Action for U.S. Appl. No. 15/215,377, dated Apr. 7, 2017.
Office Action for U.S. Appl. No. 13/098,490, dated Apr. 6, 2017.
Office Action for U.S. Appl. No. 14/662,092, dated Mar. 29, 2017.
Office Action for U.S. Appl. No. 14/817,097, dated May 4, 2017.
Office Action for U.S. Appl. No. 14/872,966, dated Apr. 20, 2017.
Office Action for U.S. Appl. No. 14/680,915, dated May 3, 2017.
Office Action for U.S. Appl. No. 14/792,166, dated Apr. 26, 2017.

* cited by examiner

TRANSPARENT INTERCONNECTION OF ETHERNET FABRIC SWITCHES

RELATED APPLICATION

This application claims the benefit of U.S. Provisional Application No. 61/874,919, titled "Transparent Inter Ethernet Fabric Switch Routing," by inventors Venkata R. K. Addanki, Mythilikanth Raman, and Shunjia Yu, filed 6 Sep. 2013, the disclosure of which is incorporated by reference herein.

The present disclosure is related to U.S. patent application Ser. No. 13/087,239, titled "Virtual Cluster Switching," by inventors Suresh Vobbilisetty and Dilip Chatwani, filed 14 Apr. 2011; and U.S. patent application Ser. No. 12/725,249, titled "Redundant Host Connection in a Routed Network," by inventors Somesh Gupta, Anoop Ghanwani, Phanidhar Koganti, and Shunjia Yu, filed 16 Mar. 2010, the disclosures of which are incorporated by reference herein.

BACKGROUND

Field

The present disclosure relates to network design. More specifically, the present disclosure relates to a method for a constructing a scalable switching system.

Related Art

The exponential growth of the Internet has made it a popular delivery medium for a variety of applications running on physical and virtual devices. Such applications have brought with them an increasing demand for bandwidth. As a result, equipment vendors race to build larger and faster switches with versatile capabilities. However, the size of a switch cannot grow infinitely. It is limited by physical space, power consumption, and design complexity, to name a few factors. Furthermore, switches with higher capability are usually more complex and expensive. More importantly, because an overly large and complex system often does not provide economy of scale, simply increasing the size and capability of a switch may prove economically unviable due to the increased per-port cost.

A flexible way to improve the scalability of a switch system is to build a fabric switch. A fabric switch is a collection of individual member switches. These member switches form a single, logical switch that can have an arbitrary number of ports and an arbitrary topology. As demands grow, customers can adopt a "pay as you grow" approach to scale up the capacity of the fabric switch.

Meanwhile, layer-2 (e.g., Ethernet) switching technologies continue to evolve. More routing-like functionalities, which have traditionally been the characteristics of layer-3 (e.g., Internet Protocol or IP) networks, are migrating into layer-2. Notably, the recent development of the Transparent Interconnection of Lots of Links (TRILL) protocol allows Ethernet switches to function more like routing devices. TRILL overcomes the inherent inefficiency of the conventional spanning tree protocol, which forces layer-2 switches to be coupled in a logical spanning-tree topology to avoid looping. TRILL allows routing bridges (RBridges) to be coupled in an arbitrary topology without the risk of looping by implementing routing functions in switches and including a hop count in the TRILL header.

While a fabric switch brings many desirable features to a network, some issues remain unsolved in efficiently interconnecting a plurality of fabric switches.

SUMMARY

One embodiment of the present invention provides a switch. The switch includes a fabric switch module and a border module. The fabric switch module maintains a membership in a first fabric switch. The fabric switch includes a plurality of switches and operates as a single logical switch. The border module determines that the egress switch identifier in a first encapsulation header of a first packet is associated with a switch outside of the fabric switch. The first packet is forwardable in the first fabric switch based on the first encapsulation header. In response to the determination, the border module changes the ingress switch identifier in the first encapsulation header of the first packet to a first virtual switch identifier associated with a first virtual switch. This first virtual switch externally represents the first fabric switch.

In a variation on this embodiment, the egress switch identifier in the first encapsulation header is a second virtual switch identifier associated with a second virtual switch, which externally represents a second fabric switch.

In a further variation, routing information of the first fabric switch indicates that the second virtual switch is reachable via the switch.

In a further variation, the border module determines that the egress switch identifier in a second encapsulation header of a second packet is the first virtual switch identifier. In response to the determination, the border module changes the egress switch identifier in the second encapsulation header of the second packet to a switch identifier which identifies a member switch in the first fabric switch.

In a further variation, the ingress switch identifier in the second encapsulation header of the second packet is the second virtual switch identifier.

In a further variation, the switch also includes a forwarding module which determines that the egress switch identifier in a third encapsulation header of a third packet is a switch identifier of the switch. The ingress switch identifier in the second encapsulation header of the third packet is the second virtual switch identifier. The switch also includes a learning module which learns a media access control (MAC) address from an inner packet of the third packet and stores the learned MAC address in association with the second virtual switch identifier in a storage device.

In a further variation on this embodiment, the switch also includes a forwarding module which determines an external switch as a next-hop switch for the first packet based on the first encapsulation header. This external switch is not a member switch of the first fabric switch.

In a further variation on this embodiment, the first encapsulation header is one or more of: (i) a Transparent Interconnection of Lots of Links (TRILL) header, wherein the ingress and egress switch identifiers of the first encapsulation header are TRILL routing bridge (RBridge) identifiers; and (ii) a Internet Protocol (IP) header, wherein the ingress and egress switch identifiers of the first encapsulation header are IP addresses.

BRIEF DESCRIPTION OF THE FIGURES

In the figures, like reference numerals refer to the same figure elements.

DETAILED DESCRIPTION

Figure 1:
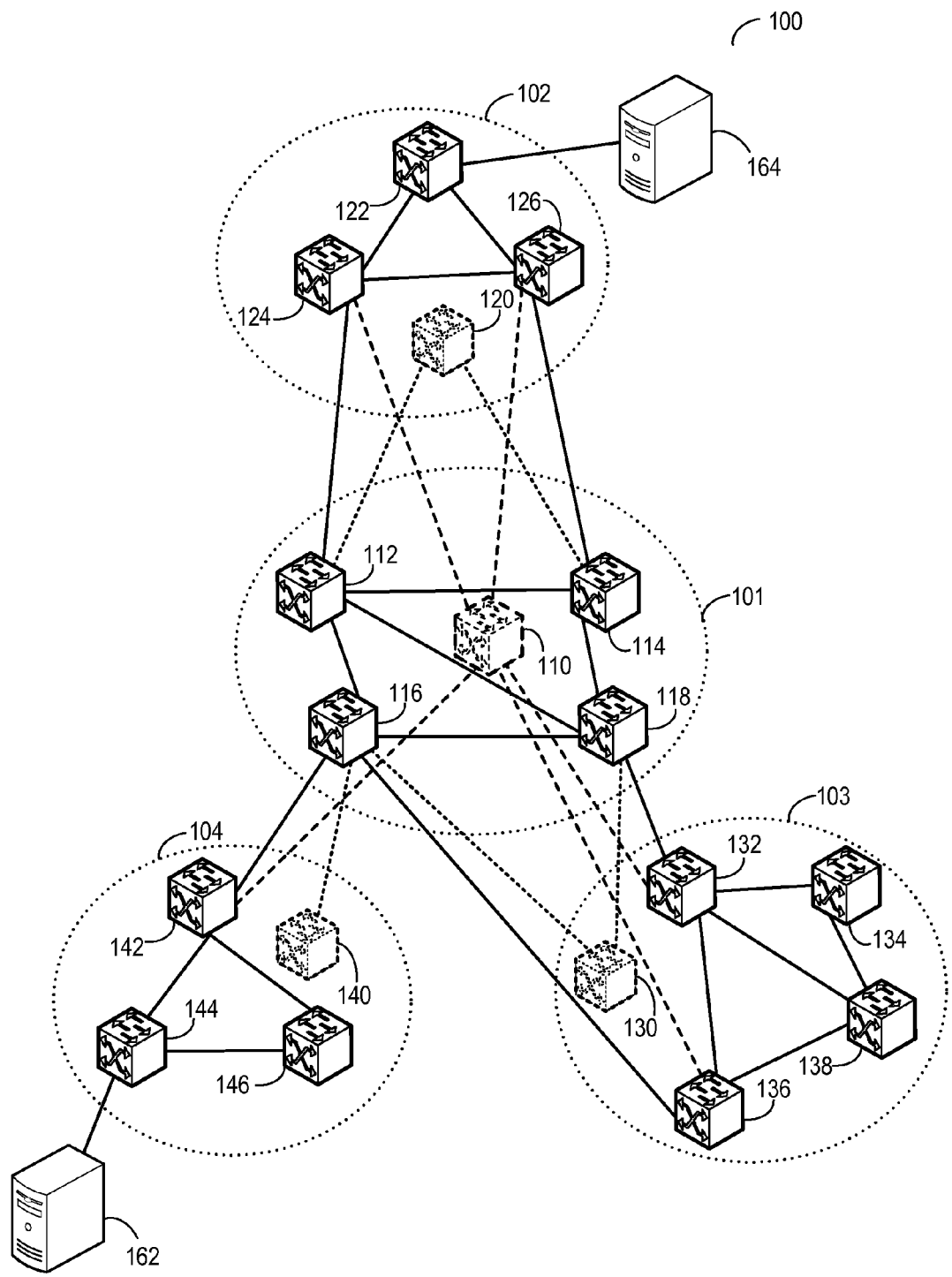
FIG. 1 illustrates exemplary transparent interconnections of fabric switches, in accordance with an embodiment of the present invention.

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the claims.

Overview

In embodiments of the present invention, the problem of efficiently coupling a plurality of fabric switches is solved by representing a fabric switch as a single switch to another other fabric switch. For example, the single switch can be a virtual switch. Member switches of this other fabric switch view the virtual switch as another switch with fabric encapsulation support and forward a packet to the virtual switch based on the encapsulation header of the packet. In this way, the packet is transparently forwarded between two fabric switches.

With existing technologies, the member switches of a fabric switch are associated with the same fabric identifier of the fabric switch. When a new member switch joins the fabric switch, the fabric identifier becomes associated with the new member switch. Once a fabric switch is formed, its forwarding information (e.g., the learned media access control (MAC) addresses and corresponding virtual local area network (VLAN) tags) is shared among its member switches. However, when the number of member switches in the fabric switch increases, the performance of the fabric switch may deteriorate. For example, a respective member switch maintains configuration data and forwarding information of a respective other member switch. As the number of member switches becomes large, managing such information can require significant hardware and/or software resources, leading to deterioration of the performance of the fabric switch.

On the other hand, instead of a large fabric switch, the switches can form a plurality of interconnected fabric switches. As a result, few member switches (can be referred to as border switches) participate in a plurality of fabric switches, leading to additional hardware and management constraints on those border switches. For example, to ensure proper traffic isolation, a border switch can be aware of the VLANs of a respective fabric switch. Furthermore, when this border switch forwards traffic across different fabric switches, the border switch learns MAC addresses of end devices coupled to different fabric switches. Moreover, these border switches may need to participate in multiple instances of routing protocols in different fabric switches. As a result, interconnecting a plurality of fabric switches may not scale well.

To solve this problem, a fabric switch is represented as a virtual switch to its neighbor fabric switches. For example, a fabric switch externally appears as a single virtual switch, which supports the fabric encapsulation, to other fabric switches and/or compliant networks. This allows the other fabric switches and/or compliant networks to forward a packet to that fabric switch based on the encapsulation header of that packet without learning forwarding and configuration information of individual switches. The border member switches of the fabric switch, which adjoin the other fabric switches and/or compliant networks, can translate between the switch identifiers of virtual and physical switches, and perform the corresponding route lookup for corresponding network. As a result, a large number of switches can form a large network, which is isolated into small manageable fabric switches.

Upon receiving a packet from an adjoining fabric switch and/or compliant network, a border member switch decides how to forward that packet within the local fabric switch. Furthermore, when a member switch of the local fabric switch learns MAC addresses of end devices coupled to a remote fabric switch, the member switch stores the learned MAC address with the virtual switch representing that remote fabric switch instead of the individual member switch to which that end device is coupled. As a result, the member switch does not need to maintain configuration and routing information of individual member switches of the remote fabric switch. It should be noted that a remote fabric switch is a fabric switch in which a member switch of a local fabric switch does not participate and whose fabric identifier is not associated with the member switch.

In a fabric switch, any number of switches coupled in an arbitrary topology may logically operate as a single switch. The fabric switch can be an Ethernet fabric switch or a virtual cluster switch (VCS), which can operate as a single Ethernet switch. Any member switch may join or leave the fabric switch in "plug-and-play" mode without any manual configuration. In some embodiments, a respective switch in the fabric switch is a Transparent Interconnection of Lots of Links (TRILL) routing bridge (RBridge). In some further embodiments, a respective switch in the fabric switch is an Internet Protocol (IP) routing-capable switch (e.g., an IP router). The TRILL protocol is described in Internet Engineering Task Force (IETF) Request for Comments (RFC) 6325, titled "Routing Bridges (RBridges): Base Protocol Specification," available at http://datatracker.ietf.org/doc/rfc6325/, which is incorporated by reference herein.

It should be noted that a fabric switch is not the same as conventional switch stacking. In switch stacking, multiple switches are interconnected at a common location (often within the same rack), based on a particular topology, and manually configured in a particular way. These stacked switches typically share a common address, e.g., an IP address, so they can be addressed as a single switch externally. Furthermore, switch stacking requires a significant amount of manual configuration of the ports and inter-switch links. The need for manual configuration prohibits switch stacking from being a viable option in building a large-scale switching system. The topology restriction imposed by switch stacking also limits the number of switches that can be stacked. This is because it is very difficult, if not impossible, to design a stack topology that allows the overall switch bandwidth to scale adequately with the number of switch units.

In contrast, a fabric switch can include an arbitrary number of switches with individual addresses, can be based on an arbitrary topology, and does not require extensive manual configuration. The switches can reside in the same location, or be distributed over different locations. These features overcome the inherent limitations of switch stacking and make it possible to build a large "switch farm," which can be treated as a single, logical switch. Due to the automatic configuration capabilities of the fabric switch, an individual physical switch can dynamically join or leave the fabric switch without disrupting services to the rest of the network.

Furthermore, the automatic and dynamic configurability of the fabric switch allows a network operator to build its switching system in a distributed and "pay-as-you-grow" fashion without sacrificing scalability. The fabric switch's ability to respond to changing network conditions makes it an ideal solution in a virtual computing environment, where network loads often change with time.

In this disclosure, the term "fabric switch" refers to a number of interconnected physical switches which form a single, scalable logical switch. These physical switches are referred to as member switches of the fabric switch. In a fabric switch, any number of switches can be connected in an arbitrary topology, and the entire group of switches functions together as one single, logical switch. This feature makes it possible to use many smaller, inexpensive switches to construct a large fabric switch, which can be viewed as a single logical switch externally. Although the present disclosure is presented using examples based on a fabric switch, embodiments of the present invention are not limited to a fabric switch. Embodiments of the present invention are relevant to any computing device that includes a plurality of devices operating as a single device.

The term "end device" can refer to any device external to a fabric switch. Examples of an end device include, but are not limited to, a host machine, a conventional layer-2 switch, a layer-3 router, or any other type of network device. Additionally, an end device can be coupled to other switches or hosts further away from a layer-2 or layer-3 network. An end device can also be an aggregation point for a number of network devices to enter the fabric switch. An end device can also host one or more virtual machines.

The term "switch" is used in a generic sense, and it can refer to any standalone or fabric switch operating in any network layer. "Switch" should not be interpreted as limiting embodiments of the present invention to layer-2 networks. Any device that can forward traffic to an external device or another switch can be referred to as a "switch." Any physical or virtual device (e.g., a virtual machine/switch operating on a computing device) that can forward traffic to an end device can be referred to as a "switch." Examples of a "switch" include, but are not limited to, a layer-2 switch, a layer-3 router, a TRILL RBridge, or a fabric switch comprising a plurality of similar or heterogeneous smaller physical and/or virtual switches.

The term "edge port" refers to a port on a fabric switch which exchanges data frames with a network device outside of the fabric switch (i.e., an edge port is not used for exchanging data frames with another member switch of a fabric switch). The term "inter-switch port" refers to a port which sends/receives data frames among member switches of a fabric switch. If a switch is not a member of the local fabric switch and is capable of forwarding based on the encapsulation header of the fabric encapsulation, the inter-switch port coupling this switch can be referred to as a "border inter-switch port." The terms "interface" and "port" are used interchangeably.

The term "switch identifier" refers to a group of bits that can be used to identify a switch. Examples of a switch identifier include, but are not limited to, a media access control (MAC) address, an Internet Protocol (IP) address, and an RBridge identifier. Note that the TRILL standard uses "RBridge ID" (RBridge identifier) to denote a 48-bit intermediate-system-to-intermediate-system (IS-IS) System ID assigned to an RBridge, and "RBridge nickname" to denote a 16-bit value that serves as an abbreviation for the "RBridge ID." In this disclosure, "switch identifier" is used as a generic term, is not limited to any bit format, and can refer to any format that can identify a switch. The term "RBridge identifier" is also used in a generic sense, is not limited to any bit format, and can refer to "RBridge ID," "RBridge nickname," or any other format that can identify an RBridge.

The term "packet" refers to a group of bits that can be transported together across a network. "Packet" should not be interpreted as limiting embodiments of the present invention to layer-3 networks. "Packet" can be replaced by other terminologies referring to a group of bits, such as "message," "frame," "cell," or "datagram." The terms "packet" and "frame" are used interchangeably.

Network Architecture

FIG. 1 illustrates exemplary transparent interconnections of fabric switches, in accordance with an embodiment of the present invention. As illustrated in FIG. 1, a network 100 includes fabric switches 102, 103, and 104. These fabric switches are interconnected via a network 101. In some embodiments, network 101 is a fabric switch as well (under such circumstances, network 101 is also referred to as fabric switch 101). Fabric switch 102 includes member switches 122, 124, and 126; fabric switch 103 includes member switches 132, 134, 136, and 138; and fabric switch 104 includes member switches 142, 144, and 146. Network 101 includes switches 112, 114, 116, and 118. It should be noted that if network 101 is a fabric switch, switches 112, 114, 116, and 118 operate as member switches of fabric switch 101. End device 162 is coupled to fabric switch 104 via switch 144 and end device 164 is coupled to fabric switch 102 via switch 122. A member switch, such as switches 144 or 122, which couples an end device via an edge port can be referred to as an edge switch.

In some embodiments, fabric switches 102, 103, and 104 internally operate as respective TRILL networks (e.g., forward data packet based on the TRILL protocol). Then network 101 can be a compatible TRILL network, or a fabric switch which internally operates as a TRILL network. A respective member switch of network 101 and fabric switches 102, 103, and 104 can then be a TRILL RBridge (e.g., has an RBridge identifier which identifies a member switch in the corresponding fabric switch). In some further embodiments, fabric switches 102, 103, and 104 internally operate as respective IP networks (e.g., forward data packet based on the IP protocol). Then network 101 can be a compatible IP network, or a fabric switch which internally operates as an IP network. A respective member switch of network 101 and fabric switches 102, 103, and 104 can then be an IP-capable switch (e.g., has an IP address which identifies a member switch in the corresponding fabric switch and/or a larger network). An IP-capable switch can calculate and maintain a local IP routing table (e.g., a routing information base or RIB), and is capable of forwarding packets based on its IP addresses.

Switches in a fabric switch use edge ports to communicate with end devices (e.g., non-member switches) and inter-switch ports to communicate with other member switches. Data communication via an edge port can be based on Ethernet and via an inter-switch port can be based on IP and/or TRILL protocol. For example, switch 122 of fabric switch 102 is coupled to end device 164 via an edge port and to switches 124 and 128 via inter-switch ports and one or more links. Switch 122 can communicate with end device 164 based on Ethernet and with switch 124 and 126 based on IP or TRILL. It should be noted that control message exchange via inter-switch ports can be based on a different protocol (e.g., Internet Protocol (IP) or Fibre Channel (FC) protocol).

Furthermore, a switch in a fabric switch coupled with a switch in another fabric switch or a compatible network via a border inter-switch port. For example, switch 124 of fabric switch 102 is coupled with switch 112 of fabric switch 101 (or a compatible network 101) via a border inter-switch port. Forwarding to and/or via a compatible network does not require decapsulation of a fabric encapsulation. For example, if fabric encapsulation for fabric switch 102 is based on the TRILL protocol, switch 124 can forward a TRILL-encapsulated packet to and/or via network 101 (i.e., to switch 112) based on TRILL forwarding.

In some embodiments, fabric switch 102 is assigned a fabric switch identifier. A respective member switch of fabric switch 102 is associated with that fabric switch identifier. This allows a member switch to indicate that it is a member of fabric switch 102. In some embodiments, whenever a new member switch joins fabric switch 102, the fabric switch identifier is automatically associated with that new member switch. Similarly, fabric switch 103 and 104 (and fabric switch 101) are assigned corresponding fabric switch identifiers. Furthermore, a respective member switch of fabric switch 102 is assigned a switch identifier (e.g., an RBridge identifier, a Fibre Channel (FC) domain ID (identifier), or an IP address). This switch identifier identifies the member switch in fabric switch 102. Similarly, a respective member switch of fabric switch 103 and 104 (and fabric switch 101) is assigned a switch identifier.

With existing technologies, switches 122, 124, and 126 of fabric switch 102 are associated with the same fabric identifier of fabric switch 102. When a new member switch joins fabric switch 102, the fabric identifier becomes associated with that new member switch. Once fabric switch 102 is formed, its forwarding information (e.g., the learned MAC addresses and corresponding virtual local area network (VLAN) tags) is shared among member switches 122, 124, and 126. As a result, a respective member switch of fabric switch 102 maintains a large number of learned MAC address and its association with a member switch. As a result, if the number of member switches in fabric switch 102 increases, the performance of fabric switch 102 may deteriorate. For example, switch 122 maintains configuration data and forwarding information of switches 124 and 126. This allows switch 122 to forward packets to MAC address associated with switch 124 and 126. As the number of member switches in fabric switch 102 becomes large, managing such information can deteriorate the performance of fabric switch 102.

On the other hand, instead of a large fabric switch, the switches in network 100 can form a plurality of interconnected fabric switches 101, 102, 103, and 104. As a result, few member switches, which can be referred to as border switches, may participate in a plurality of fabric switches. For example, border switches 124 and 126 may participate in fabric switch 101 in addition to their local fabric switch 102. As a result, switch 124 and 126 maintain learned MAC addresses, forwarding information, and configuration information of both fabric switches 101 and 102. This leads to additional hardware and management constraints on switches 124 and 126.

Furthermore, to ensure proper traffic isolation, border switches 124 and 126 is aware of VLAN configurations of both fabric switches 101 and 102. For example, to ensure VLAN continuity, when forwarding a packet to switch 112 in fabric switch 101, switch 124 checks whether the VLAN of the packet is configured in switch 112. As a result, in addition to VLAN configurations of switches 122 and 126, switch 124 maintains VLAN configurations of switches 112, 114, 116, and 118. Similarly, border switches 112 and 114 of fabric switch 101 can be aware of VLAN configurations of both fabric switches 101 and 102. This can also lead to additional hardware and management constraints on these border switches.

Moreover, if border switch 112 receives traffic from end device 164 via switch 124, switch 112 learns MAC addresses of end device 164 and its association information with switch 122. Switch 112 shares this information with switches 114, 116, and 118. As a result, switches 112, 114, 116, and 118 maintain MAC address of end device 164 and its association with switch 122, as well as forwarding information for switch 122. To ensure packet forwarding between fabric switches 101 and 102, border switches 112, 114, 124, and 126 participate in respective instances of routing protocols of fabric switches 101 and 102. For example, border switch 112 computes route to switch 118 based on the routing protocol instance of fabric switch 101 and route to switch 122 based on the routing protocol instance of fabric switch 102. As a result, interconnecting a plurality of fabric switches may not scale well.

To solve this problem, fabric switch 102 is represented as a virtual switch 120 (denoted with dotted lines) to other fabric switches and compatible networks of network 100. For example, fabric switch 102 appears as virtual switch 120 to network 101, and fabric switches 103 and 104. Switches 112 and 114 consider themselves to be coupled to virtual switch 120. In other words, interconnections between switches 112 and 114 with switches 124 and 126 are represented to switches 112 and 114 as interconnections between switches 112 and 114 with virtual switch 120. Similarly, fabric switch 103 is represented as a virtual switch 130 (denoted with dotted lines) to other fabric switches and compatible networks of network 100. Fabric switch 103 appears as virtual switch 130 to network 101, and fabric switches 102 and 104. Switches 116 and 118 consider themselves to be coupled to virtual switch 130. In the same way, fabric switch 104 is represented as a virtual switch 140 (denoted with dotted lines) to other fabric switches and compatible networks of network 100. Fabric switch 104 appears as virtual switch 140 to network 101, and fabric switches 102 and 103. Switch 116 considers itself to be coupled to virtual switch 140. If network 101 operates as a fabric switch, network 101 is represented as a virtual member switch 110 (denoted with dashed lines) to other fabric switches of network 100.

Switches in fabric switch 104 consider virtual switch 120 to be reachable via switch 142. Routing information in fabric switch 104 indicates that virtual switch 120 is reachable via switch 142. Routing, forwarding, and failure recovery of a fabric switch is specified in U.S. patent application Ser. No. 13/087,239, titled "Virtual Cluster Switching," by inventors Suresh Vobbilisetty and Dilip Chatwani, filed 14 Apr. 2011, the disclosure of which is incorporated herein in its entirety. Similarly, switches in fabric switch 103 consider virtual switch 120 to be reachable via switches 132 and 136, and switches in fabric switch 101 consider virtual switch 120 to be reachable via switches 112 and 114, and compatible network 101. For the packets from fabric switch 102, switches 124 and 126 can translate between the switch identifier of virtual switch 120 and a corresponding physical switch, and perform the route lookup. As a result, in the links between fabric switch 102 and compatible network 101, the ingress and/or egress switch identifiers of a packet can be virtual switch identifiers. This allows a large number of switches to form a large network 100, which is isolated into small manageable fabric switches 102, 103, and 104 interconnected via compatible network 101.

During operation, end device 164 sends packet to end device 162. This packet can be an Ethernet frame. Switch 122 receives the packet via an edge port and encapsulates the packet with a fabric encapsulation (e.g., TRILL or IP encapsulation) and forwards. If switch 122 does not know the MAC address of end device 162, switch 122 assigns an "all-switch" switch identifier as the egress switch identifier of the encapsulation header. An "all-switch" switch identifier indicates that the fabric-encapsulated packet should be forwarded to a respective switch in a network. For example, if switch 132 receives a packet with an "all-switch" switch identifier as the egress identifier, switch 132 forwards the packet to switches 134, 136, and 138 of fabric switch 103.

When the encapsulated packet from switch 122 reaches border switch 124 (or 126), switch 124 modifies the encapsulation header by changing the ingress switch identifier of the encapsulation header from the switch identifier (e.g., an RBridge identifier or an IP address) of switch 122 to a virtual switch identifier (e.g., a virtual RBridge identifier or a virtual IP address) of virtual switch 120. Switch 124 forwards that packet to switch 112. In this way, switch 124 operates as an egress border switch, which forwards a fabric-encapsulated packet to outside of the local fabric switch (e.g., fabric switch 104) via a border inter-switch port. It should be noted that forwarding includes determining an egress (or output) port associated with the destination address and transmitting via the determined egress port.

Upon receiving the fabric-encapsulated packet, switch 112 determines that the egress switch identifier is an "all-switch" switch identifier and forwards the fabric-encapsulated packet to a respective switch in network 101. Upon receiving the packet, switch 116 and 118 forward the packet to switch 142 of fabric switch 104 and switch 132 of fabric switch 103, respectively. It appears to switch 116 and 118 that the packet is forwarded to virtual switch 140 and 130, respectively. In this way, compliant network 101 can forward the packet based on the encapsulation header among fabric switches coupled to network 101. Upon receiving the fabric-encapsulated packet, switch 142 determines that the egress switch identifier is an "all-switch" switch identifier and forwards the fabric-encapsulated packet to a respective switch in fabric switch 104. In this way, switch 142 operates as an ingress border switch, which forwards a fabric-encapsulated packet received via a border inter-switch in the local fabric switch (e.g., fabric switch 104).

Switch 142 can also decapsulate the fabric-encapsulated packet to obtain the inner packet (i.e., the Ethernet packet from end device 164) and determine whether any local end device is the destination of the inner packet. Switch 142 can learn the MAC address of end device 164 and stores the learned MAC address in association with the virtual switch identifier of virtual switch 120. Similarly, switch 144 receives the fabric-encapsulated packet, decapsulates the packet to obtain the inner packet, and determines whether any local end device is the destination of the inner packet. Switch 144 learns the MAC address of end device 164 and stores the learned MAC address in association with the virtual switch identifier of virtual switch 120. Switch 144 also determines that destination end device 162 is locally coupled (e.g., either based on a populated table, previous MAC address learning, or flooding), and forwards the inner packet to end device 162. In this way, fabric switches 102, 103, and 104 are transparently interconnected via compatible network 101.

In some embodiments, switches in network 101 decapsulate the fabric-encapsulated packet to determine whether any local end device is the destination of the inner packet (i.e., the Ethernet packet from end device 164). If a switch in network 101 learns the MAC address of end device 164, that switch stores the learned MAC address in association with the ingress switch identifier, which is a virtual switch identifier, in the encapsulation header. For example, if network 101 is a TRILL network and switch 112 receives a TRILL-encapsulated packet from fabric switch 102, upon decapsulating the TRILL header, switch 112 can learn the MAC address of the inner packet and stores the learned MAC address in association with the virtual switch identifier of virtual switch 120.

The routes (e.g., can be configured or computed based on a routing protocol) in fabric switch 102 indicate that virtual switch 120 is reachable via switch 142. Hence, to send a packet to end device 164, a switch in fabric switch 104 forwards the packet to switch 142. For example, if end device 162 sends a packet to end device 164, switch 144 receives the packet, encapsulates the packet in a fabric encapsulation, and assigns the virtual switch identifier of virtual switch 120 as the egress switch identifier of the encapsulation header. When the encapsulated packet reaches border switch 142, switch 142 modifies the encapsulation header by changing the ingress switch identifier of the encapsulation header from the switch identifier of switch 144 to a virtual switch identifier of virtual switch 140. Switch 142 forwards that packet to switch 116. Switch 116 determines that virtual switch 120 is reachable via switches 112 and 114. Suppose that switch 116 forwards the packet to switch 112, which in turn, forwards the packet to switch 124. Switch 124 changes the egress switch identifier of the encapsulation header from the virtual switch identifier of virtual switch 120 to switch identifier of switch 122, and forwards the packet.

Hence, in network 100, border switches 124 and 126 of fabric switch 102 do not need to participate in routing instances of fabric switches 103 and 104, and maintain forwarding information for individual switches of fabric switches 103 and 104. Since switches 124 and 126 are at the edge between network 101 and fabric switch 102, switches 124 and 126 determines how to forward packets received from network 101 within fabric switch 102. Furthermore, when switch 124 or 126 learns the MAC address of an end device coupled to a remote fabric (e.g., end device 162 coupled to fabric switch 104), switch 124 or 126 associates the learned MAC address with the virtual switch identifier of fabric switch 104 rather than the switch identifier of switch 144.

In some embodiments, network 101 can be any network which allows forwarding of fabric encapsulated packets based on encapsulation headers. For example, if the fabric encapsulation is based on the TRILL protocol, switches 112, 114, 116, and 118 can forward a packet based on the ingress and egress TRILL RBridge identifiers in the TRILL header of a TRILL encapsulated packet. This allows fabric switches 102, 103, and 104 to interconnect via a compatible network 101 without requiring network 101 to be a fabric switch. As result, network 101 can provide interconnection among fabric switches 102, 103, and 104 without providing connectivity within a fabric switch. Border switches (e.g., switches 124 and 126 of fabric switch 102) forward fabric-encapsulated packets to network 101 via corresponding border inter-switch ports.

Since border switches 124 and 126 translate between virtual and physical switch identifiers, in the links between fabric switch 102 and compatible network 101, the ingress and/or egress switch identifiers of the encapsulation headers of the packets can be virtual switch identifiers. Hence, compatible network 101 can only view virtual switches 120, 130, and 140 coupled to it instead of fabric switches 102, 103, and 104, respectively. As a result, network 101 can forward traffic only based on the fabric encapsulation without requiring to learn MAC addresses of encapsulated packets. In this way, fabric switches 102, 103, and 104 are transparently interconnected via compatible network 101.

Data Communication

Figure 2A:
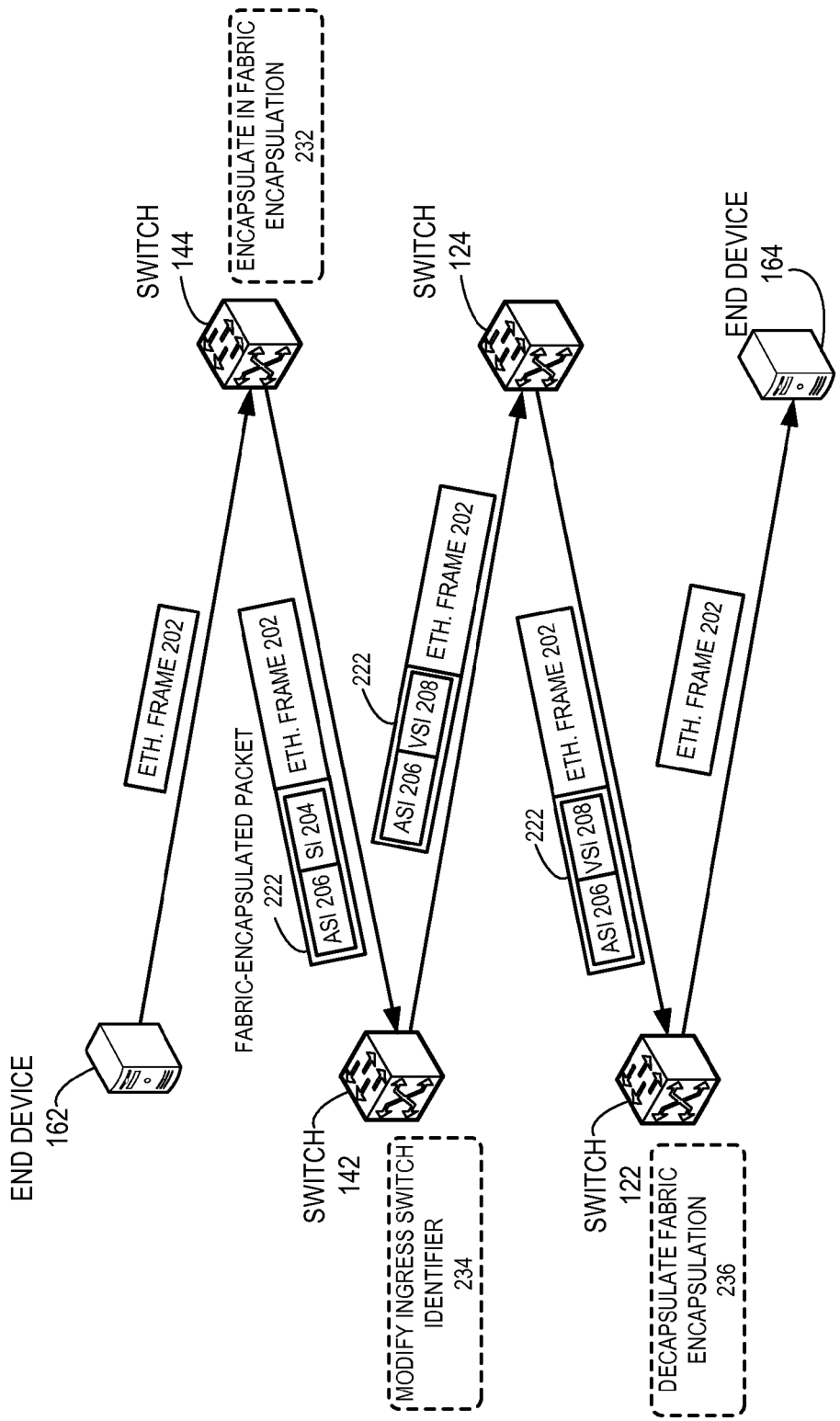
FIG. 2A illustrates an exemplary forwarding of a packet with an unknown destination between transparently interconnected fabric switches, in accordance with an embodiment of the present invention.

FIG. 2A illustrates an exemplary forwarding of a packet with an unknown destination between transparently interconnected fabric switches, in accordance with an embodiment of the present invention. During operation, end device 162 sends an Ethernet frame 202 to end device 164. Suppose that the destination address of Ethernet frame 202 (i.e., the MAC address of end device 164) is unknown to fabric switch 104. Edge switch 144 receives the packet via an edge port. Switch 144 learns the MAC address of end device 162 and adds the MAC address to its local MAC address table (can also be referred to as forwarding table) in association with the edge port (e.g., based on a port identifier). Switch 144 also generates a notification message comprising the learned MAC address and sends the notification message to switches 142 and 146. In turn, switches 142 and 146 learn the MAC address of end device 162 and add the MAC address to their respective local MAC address tables in association with switch identifier 204 (e.g., an RBridge identifier or an IP address) of switch 144. In some embodiments, switches 142 and 146 further associate the MAC address of end device 162 with the edge port of switch 144 (e.g., based on a port identifier).

Switch 144 encapsulates Ethernet frame 202 with a fabric encapsulation (e.g., TRILL or IP encapsulation) to create fabric-encapsulated packet 222 (operation 232). Since switch 144 does not know the destination (i.e., has not learned the destination MAC address), switch 144 assigns an "all-switch" switch identifier 206 as the egress switch identifier and switch identifier 204 of switch 144 as the ingress switch identifier of the encapsulation header. Switch 144 forwards packet 222 to a respective switch in fabric switch 104. It should be noted that forwarding includes determining an egress (or output) port associated with the destination address and transmitting via the determined egress port.

When packet 222 reaches border switch 142, switch 142 modifies the encapsulation header by changing the ingress switch identifier of the encapsulation header from switch identifier 204 of switch 144 to a virtual switch identifier 206 (e.g., a virtual RBridge identifier or a virtual IP address) of virtual switch 140. Switch 142 forwards packet 222 to switch 116 of network 101 (not shown in FIG. 2A). In this way, switch 142 operates as an egress border switch. Switch 116 forwards packet 222 to a respective switch of network 101. In some embodiments, upon receiving packet 222, a respective switch in network 101 decapsulates packet 222 to extract frame 202 and forwards packet 222 to the virtual switches it is coupled to, as described in conjunction with FIG. 1.

Since virtual switch 120 is reachable via both switches 112 and 114, switches in compatible network 101 can use equal cost multiple path (ECMP) to determine via which switch packet 222 should be forwarded. Suppose that, switch 112 receives and forwards packet 222 to virtual switch 120. In turn, switch 124 of fabric switch 102 receives packet 222 forwarded by switch 112. In this way, border switch 142 of fabric switch 104 transparently forwards fabric-encapsulated packet 222 to border switch 124 of fabric switch 102 via compatible network 101.

Upon receiving packet 222, switch 124 determines that the egress switch identifier is an "all switch" switch identifier and forwards packet 222 to a respective switch in fabric switch 102. In this way, switch 124 operates as an ingress border switch. Switch 124 can also decapsulate packet 222 to obtain the inner packet (i.e., Ethernet frame 202) and determine whether any local end device corresponds to the destination MAC address of Ethernet frame 202. Switch 142 also learns the MAC address of end device 162 and stores the learned MAC address in association with the virtual switch identifier 208 of virtual switch 140. Switch 122 receives packet 222, decapsulates packet 222 to obtain Ethernet frame 202 (operation 236), and determines whether any local end device corresponds to the destination MAC address of Ethernet frame 202. Switch 122 learns the MAC address of end device 162 and stores the learned MAC address in association with the virtual switch identifier 208 of virtual switch 140. Switch 122 also determines that destination end device 164 is locally coupled (e.g., either based on a populated table, previous MAC address learning, or flooding), and forwards Ethernet frame 202 to end device 164.

Figure 2B:
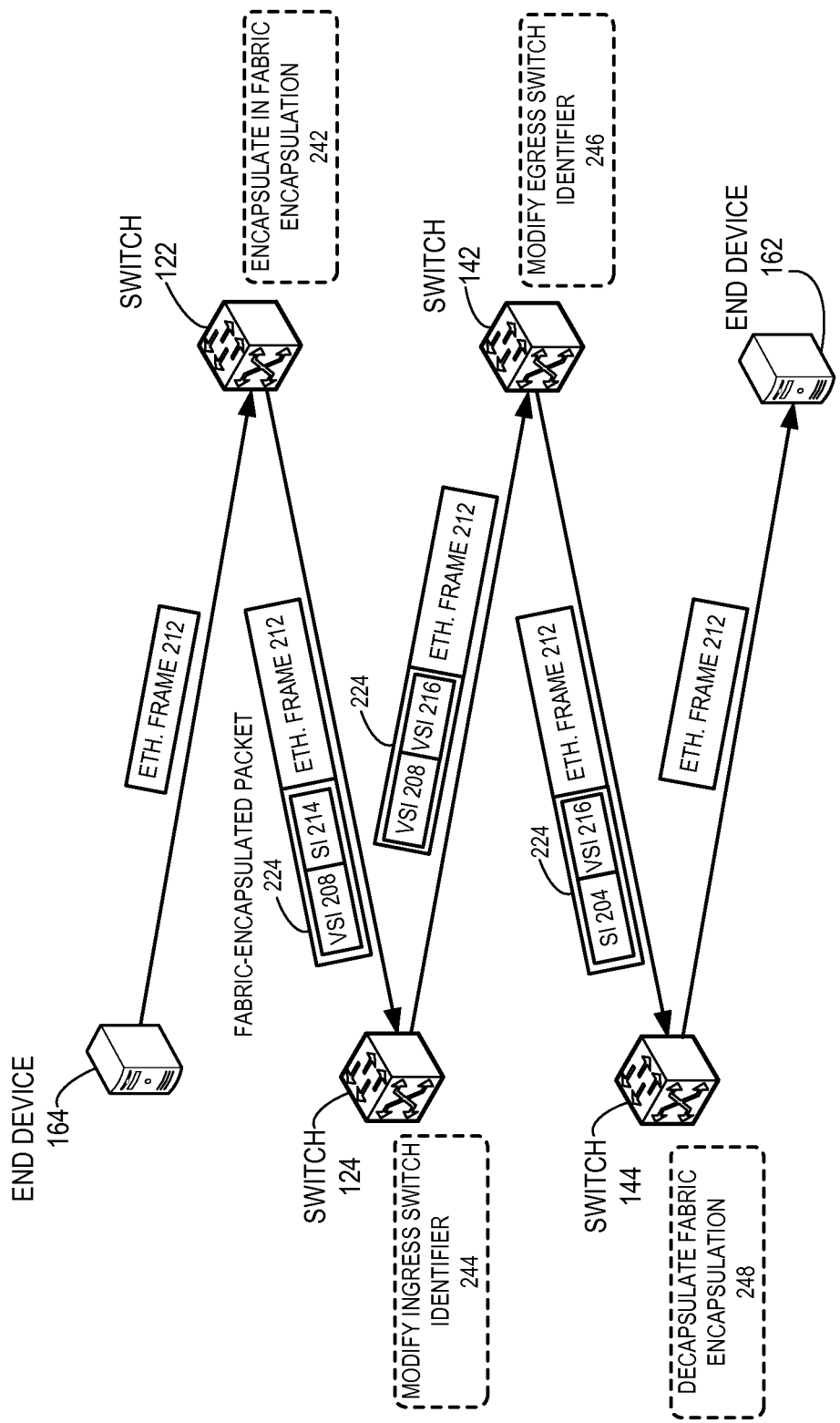
FIG. 2B illustrates an exemplary forwarding of a packet with a known destination between transparently interconnected fabric switches, in accordance with an embodiment of the present invention.

FIG. 2B illustrates an exemplary forwarding of a packet with a known destination between transparently interconnected fabric switches, in accordance with an embodiment of the present invention. During operation, end device 164 sends an Ethernet frame 212 to end device 162. Edge switch 122 receives the packet via an edge port and encapsulates the packet with a fabric encapsulation (e.g., TRILL or IP encapsulation) to create fabric-encapsulated packet 224 (operation 242). As described in conjunction with FIG. 2A, upon receiving fabric-encapsulated packet 222, switch 122 learns the MAC address of end device 162. Hence, the destination MAC address of Ethernet frame 212 is known to switch 122.

Since switch 122 has associated the MAC address of end device 162 with virtual switch identifier 208 of virtual switch 140, switch 122 assigns virtual switch identifier 208 as the egress switch identifier and a switch identifier 214 (e.g., an RBridge identifier or an IP address) of switch 122 as the ingress switch identifier of the encapsulation header. Switch 122 determines that virtual switch 140 is reachable via switch 124 and forwards packet 224 to switch 124. Route to a respective physical or virtual switch can be configured by a user (e.g., a network administrator) or computed based on a routing protocol (e.g., Intermediate System to Intermediate System (IS-IS)). In some embodiments, the configured or computed routes in fabric switch 102 indicate that virtual switch 140 is reachable via switch 124 and 126.

When packet 224 reaches border switch 124, switch 124 modifies the encapsulation header by changing the ingress switch identifier of the encapsulation header from switch identifier 214 of switch 122 to a virtual switch identifier 216 (e.g., a virtual RBridge identifier or a virtual IP address) of virtual switch 120. Switch 124 forwards packet 224 to switch 112 of network 101 (not shown in FIG. 2B). In this way, switch 124 operates as an egress border switch. Switch 112 determines that virtual switch 140 is reachable via switch 116 and forwards packet 224 to switch 116. Switch 112 forwards the packet in network 101 based on the encapsulation header of packet 224 without decapsulating the fabric encapsulation and learning the MAC address from Ethernet frame 212. Switch 116 receives and forwards packet 224 to virtual switch 140. In turn, border switch 142 of fabric switch 104 receives packet 224 forwarded by switch 116. In this way, border switch 124 of fabric switch 102 transparently forwards fabric-encapsulated packet 224 to border switch 142 of fabric switch 104 via compatible network 101.

Upon receiving the fabric-encapsulated packet, switch 142 determines that the egress switch identifier is virtual switch identifier 208 of virtual switch 140. Switch 142 decapsulate packet 224 to obtain the inner packet (i.e., Ethernet frame 212) and identifies the switch with which the destination MAC address of Ethernet frame 212 (i.e., the MAC address of end device 162) is associated. Switch 142 has associated the MAC address of end device 162 with switch identifier 204 of switch 144, as described in conjunction with FIG. 2A. Switch 142 modifies the encapsulation header by changing the egress switch identifier of the encapsulation header from virtual switch identifier 208 of virtual switch 140 to switch identifier 204 of switch 144 (operation 246). In this way, switch 142 operates as an ingress border switch. In some embodiments, switch 142 re-encapsulates Ethernet frame 212 in an encapsulation header, and assigns the switch identifier 204 as the egress switch identifier and virtual switch identifier 216 as the ingress switch identifier of the encapsulation header.

Switch 142 also learns the MAC address of end device 164 and stores the learned MAC address in association with the virtual switch identifier 216 of virtual switch 120. Switch 142 forwards packet 224 to switch 144. Switch 144 receives packet 224, decapsulates packet 224 to obtain Ethernet frame 212 (operation 248), and determines whether any local end device corresponds to the destination MAC address of Ethernet frame 212. Switch 144 also learns the MAC address of end device 164 and stores the learned MAC address in association with the virtual switch identifier 216 of virtual switch 120. Switch 144 determines that destination end device 162 is locally coupled (e.g., either based on a populated table, previous MAC address learning, or flooding), and forwards Ethernet frame 212 to end device 162.

Forwarding of a Packet with Unknown Destination

In the example in FIG. 2A, edge switch 144 receives a packet (i.e., Ethernet frame 202) with an unknown destination from a local end device 162. Switch 144 encapsulates this packet in a fabric encapsulation and forwards the fabric-encapsulated packet in fabric switch 104. Egress border switch 142 receives the fabric-encapsulated packet and forwards via a border inter-switch port to switch 116. This fabric-encapsulated packet is forwarded in network 101 and reaches ingress border switch 124 of fabric switch 102, which, in turn, forwards the fabric-encapsulated packet in fabric switch 102.

Figure 3A:
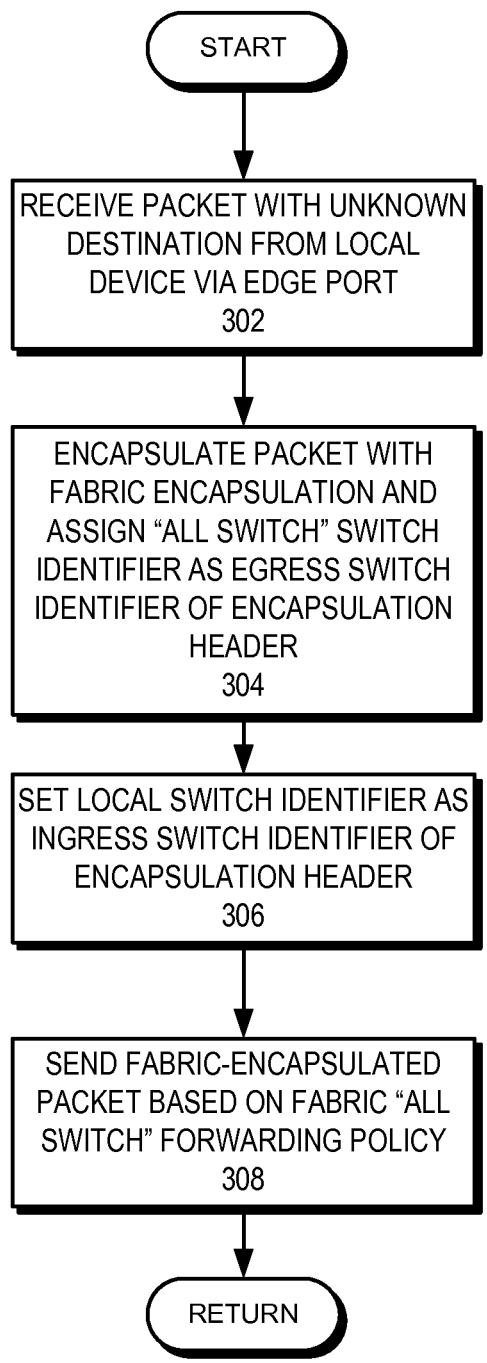
FIG. 3A presents a flowchart illustrating the process of an edge switch forwarding a packet with an unknown destination received from a local end device, in accordance with an embodiment of the present invention.

FIG. 3A presents a flowchart illustrating the process of an edge switch forwarding a packet with an unknown destination received from a local end device, in accordance with an embodiment of the present invention. During operation, the switch receives a packet with an unknown destination from a local device via an edge port (operation 302). The switch encapsulates the packet with fabric encapsulation and assign an "all switch" switch identifier as the egress switch identifier of the encapsulation header (operation 304). For example, if the fabric encapsulation is based on the TRILL protocol, the "all switch" switch identifier can be a multicast RBridge identifier. The switch sets the local switch identifier as the ingress switch identifier of the encapsulation header (operation 306) and sends the fabric-encapsulated packet based on the fabric "all switch" forwarding policy (operation 308). Examples of a fabric "all switch" forwarding policy include, but are not limited to, forwarding via fabric multicast tree, forwarding via a multicast tree rooted at an egress switch, unicast forwarding to a respective member of the fabric switch, and broadcast forwarding in the fabric switch.

Figure 3B:
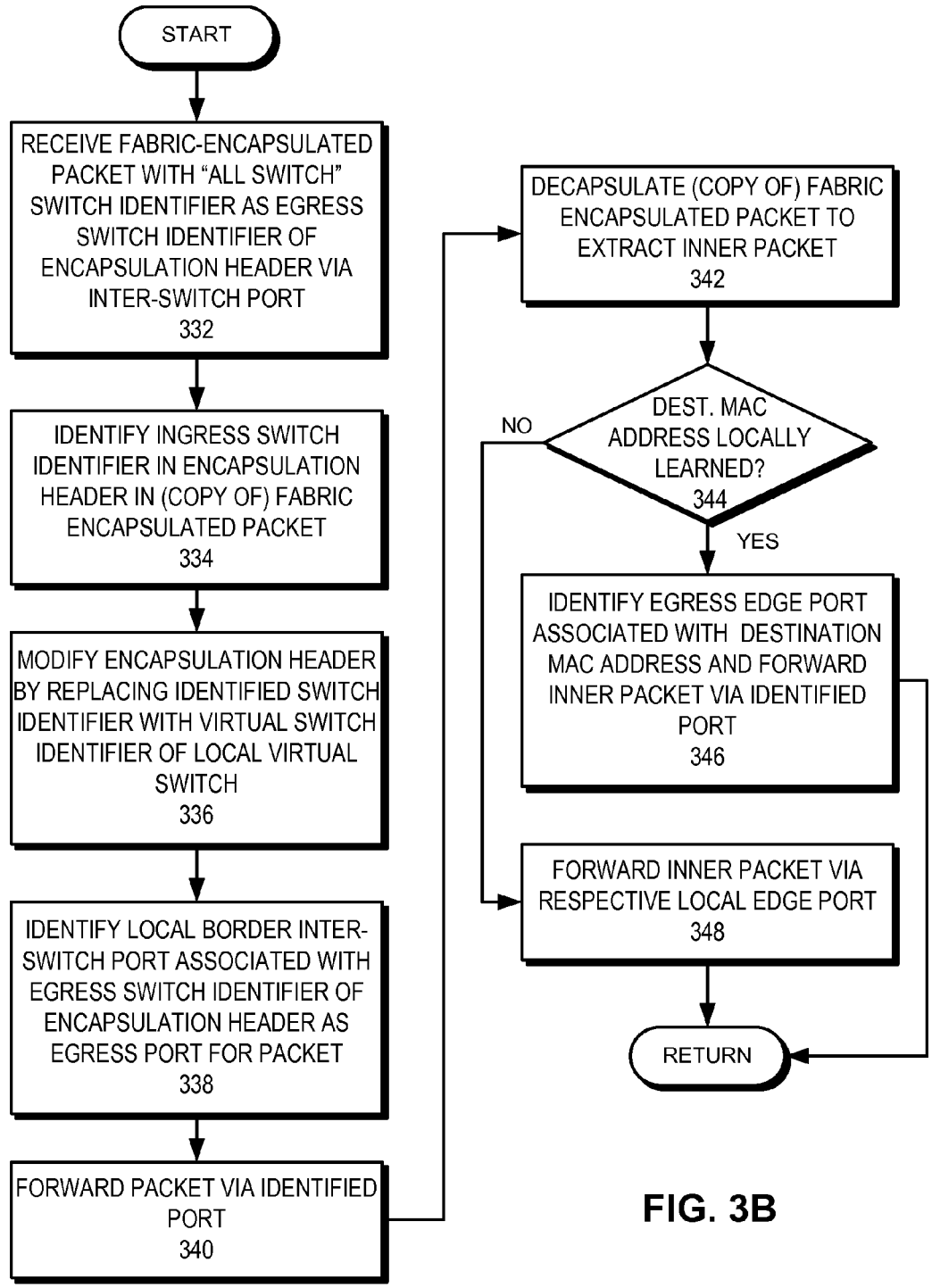
FIG. 3B presents a flowchart illustrating the process of an egress border switch forwarding a packet with an unknown destination, in accordance with an embodiment of the present invention.

FIG. 3B presents a flowchart illustrating the process of an egress border switch forwarding a packet with an unknown destination, in accordance with an embodiment of the present invention. During operation, the switch receives a fabric-encapsulated packet with "all switch" switch identifier as the egress switch identifier of the encapsulation header via an inter-switch port (operation 332). The switch then identifies the ingress switch identifier in the encapsulation header in (a copy of) the fabric-encapsulated packet (operation 334) and modifies the encapsulation header by replacing the identified switch identifier with a virtual switch identifier of a local virtual switch (operation 336). This local virtual switch represents the local fabric switch in which the switch is a member switch. The switch then identifies a local border inter-switch port associated with (e.g., mapped to) the egress switch identifier of the encapsulation header as an egress port for the packet (operation 338) and forwards the packet via the identified port (operation 340).

In some embodiments, the switch also decapsulates (a copy of) the fabric-encapsulated packet to extract the inner packet (operation 342). This allows the switch to determine whether any local end device is the destination of the inner packet. The switch then checks whether the destination MAC address of the inner packet has been locally learned (e.g., the switch has learned the destination MAC address from a local edge port) (operation 344). If the packet has been locally learned, the switch identifies an egress edge port associated with the destination MAC address of the inner packet and forwards the inner packet via the identified port (operation 346). Otherwise, the switch forwards the inner packet via a respective local edge port (operation 348).

Figure 3C:
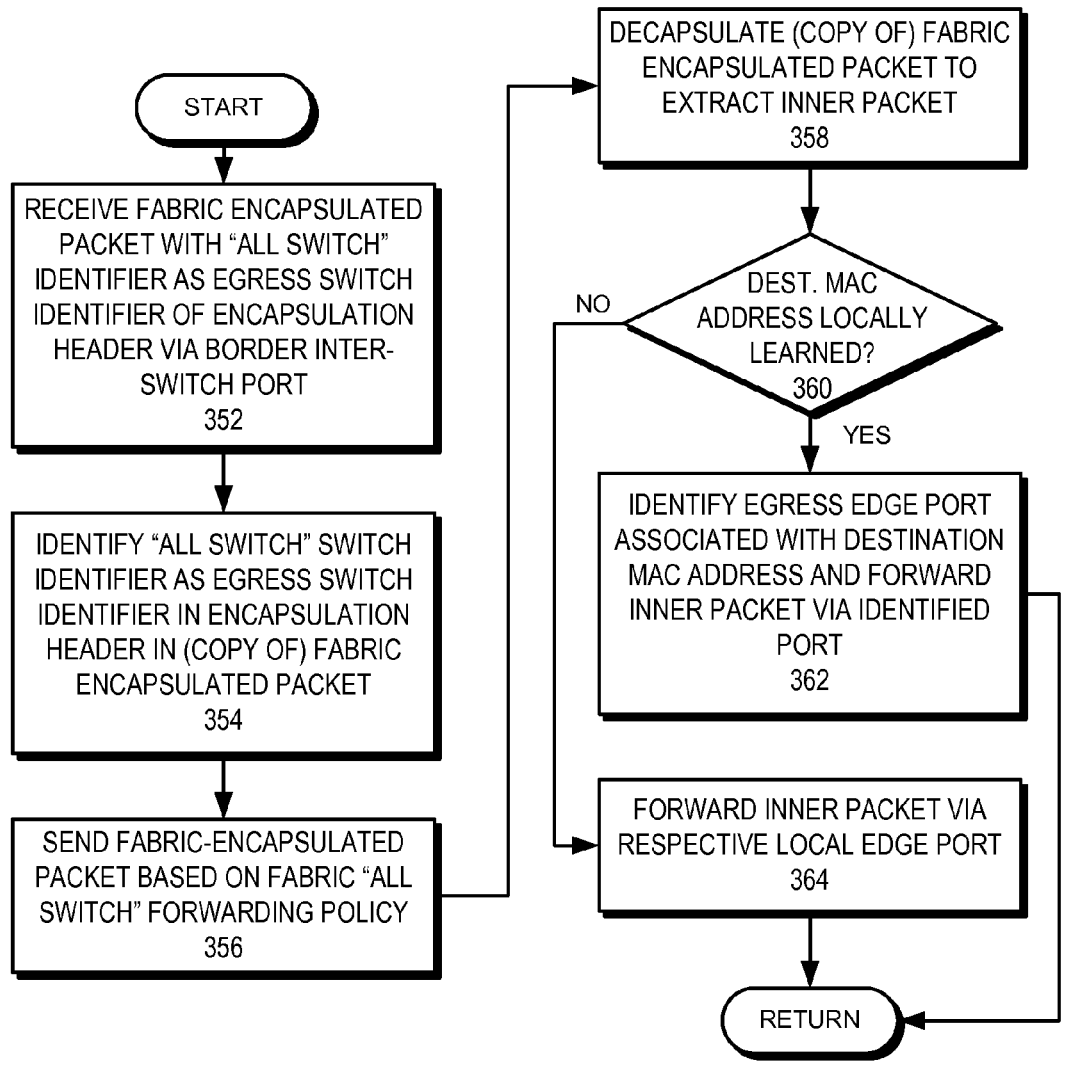
FIG. 3C presents a flowchart illustrating the process of an ingress border switch forwarding a packet with an unknown destination, in accordance with an embodiment of the present invention.

FIG. 3C presents a flowchart illustrating the process of an ingress border switch forwarding a packet with an unknown destination, in accordance with an embodiment of the present invention. During operation, the switch receives a fabric-encapsulated packet with "all switch" switch identifier as the egress switch identifier of the encapsulation header via a border inter-switch port (operation 352). The switch then identifies an "all switch" switch identifier as the egress switch identifier in the encapsulation header in the fabric-encapsulated packet (operation 354) and sends the fabric-encapsulated packet based on the fabric "all switch" forwarding policy (operation 356).

In some embodiments, the switch also decapsulates (a copy of) the fabric-encapsulated packet to extract the inner packet (operation 358). This allows the switch to determine whether any local end device is the destination of the inner packet. The switch then checks whether the destination MAC address of the inner packet has been locally learned (e.g., the switch has learned the destination MAC address from a local edge port) (operation 360). If the packet has been locally learned, the switch identifies an egress edge port corresponding to the destination MAC address of the inner packet and forwards the inner packet via the identified port (operation 362). Otherwise, the switch forwards the inner packet via a respective local edge port (operation 364).

Forwarding of a Packet with Known Destination

In the example in FIG. 2B, edge switch 122 receives a packet (i.e., Ethernet frame 212) with a known destination from a local end device 164. Switch 122 encapsulates this packet in a fabric encapsulation and forwards the fabric-encapsulated packet in fabric switch 102. Egress border switch 124 receives the fabric-encapsulated packet and forwards via a border inter-switch port to switch 112. This fabric-encapsulated packet is forwarded in network 101 and reaches ingress border switch 142 of fabric switch 104, which, in turn, forwards the fabric-encapsulated packet in fabric switch 104.

Figure 4A:
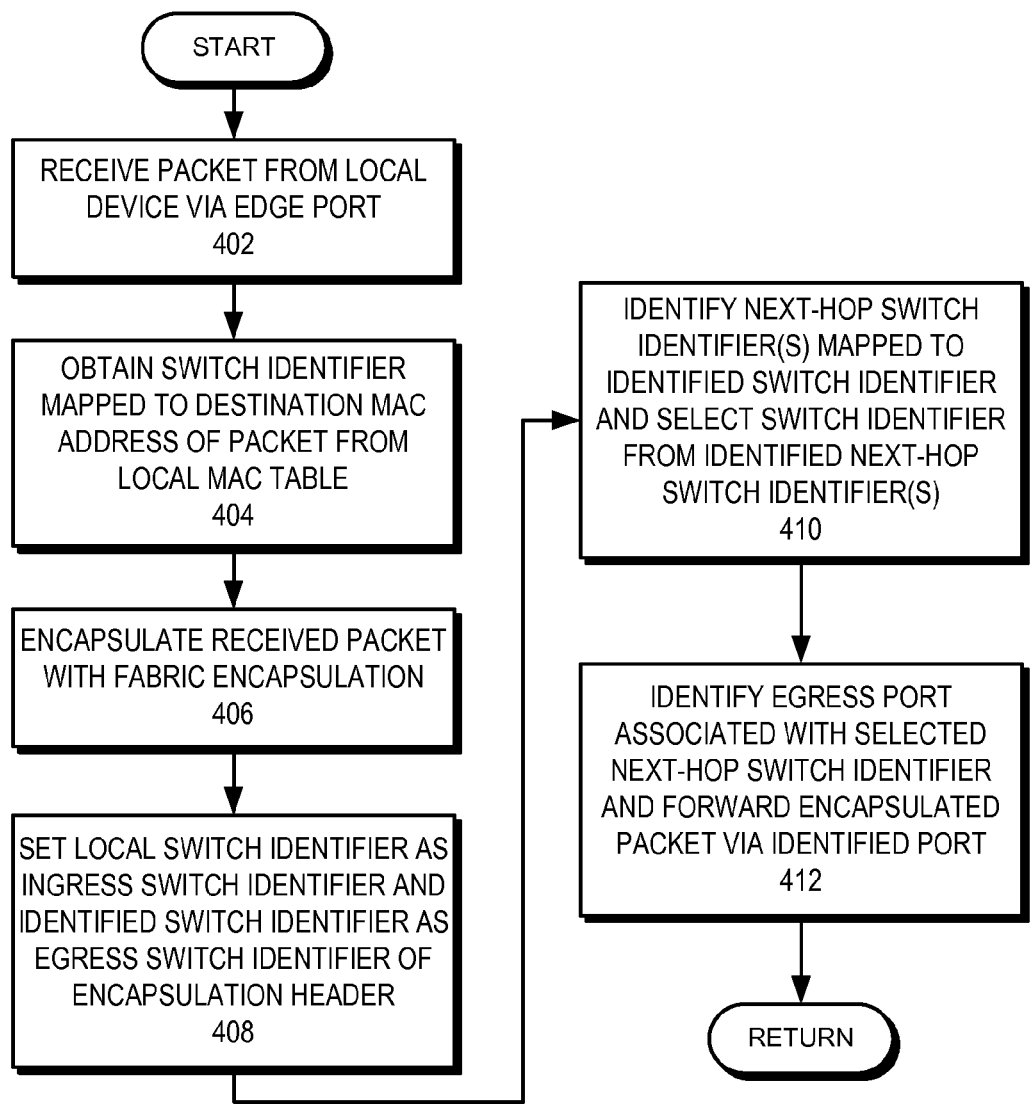
FIG. 4A presents a flowchart illustrating the process of an edge switch forwarding a packet with a known destination received from a local end device, in accordance with an embodiment of the present invention.

FIG. 4A presents a flowchart illustrating the process of an edge switch forwarding a packet with a known destination received from a local end device, in accordance with an embodiment of the present invention. During operation, the switch receives a packet (e.g., an Ethernet frame) from a local device via an edge port (operation 402). The switch obtains the switch identifier mapped to the destination MAC address of the packet from a local MAC table (operation 404). The switch encapsulates the packet with a fabric encapsulation (operation 406). It should be noted that this switch identifier can be a virtual switch identifier if the destination is behind a border inter-switch port.

The switch sets the local switch identifier as the ingress switch identifier and the identified switch identifier as the egress switch identifier of the encapsulation header (operation 408). The switch identifies the next-hop switch identifier(s) mapped to the identified switch identifier (e.g., from a local forwarding table) and selects a switch identifier from the identified next-hop switch identifier(s) (operation 410). The switch identifies an egress port corresponding to the selected next-hop switch identifier (e.g., from a local forwarding table) and forwards the encapsulated packet via the identified port (operation 412).

Figure 4B:
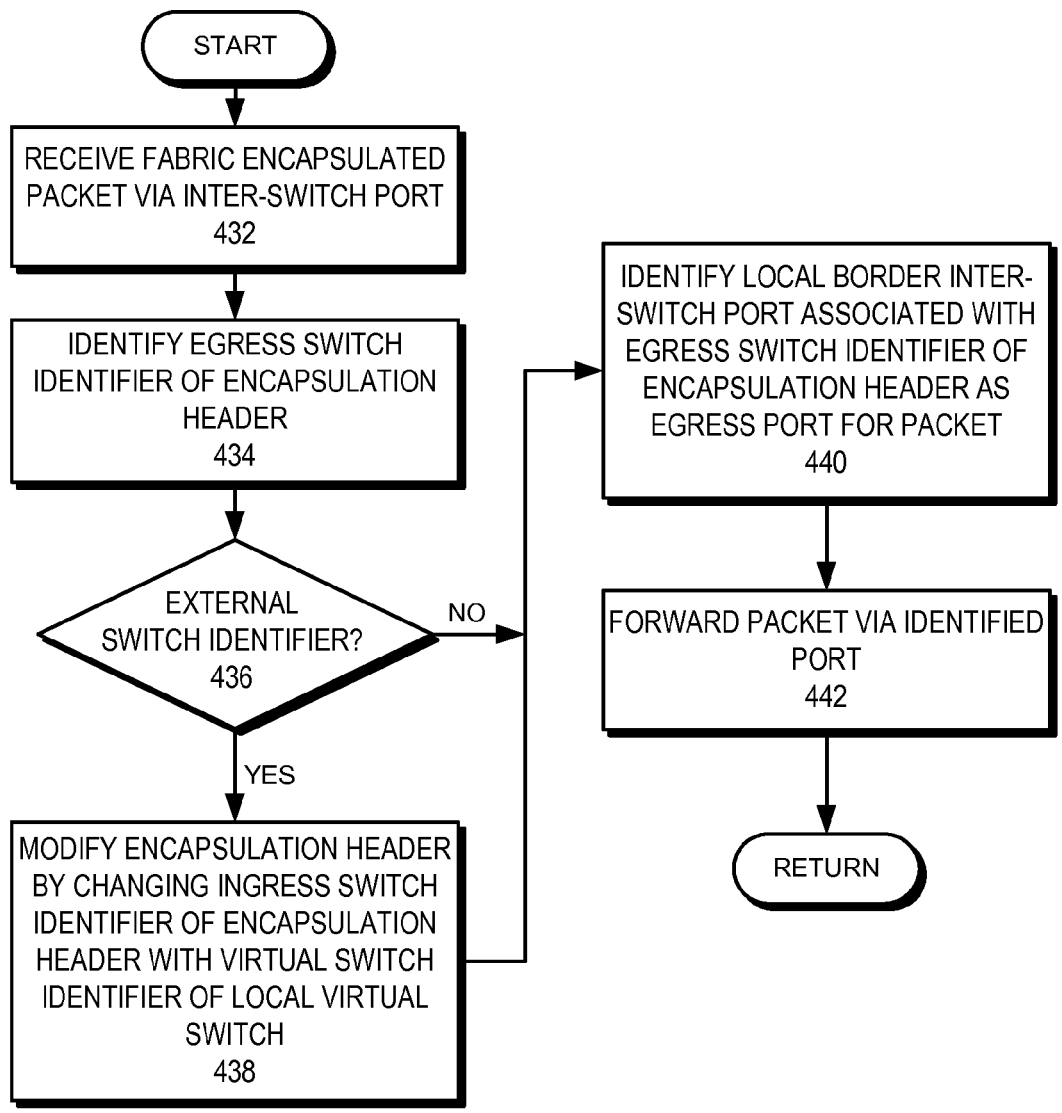
FIG. 4B presents a flowchart illustrating the process of an egress border switch forwarding a packet with a known destination, in accordance with an embodiment of the present invention.

FIG. 4B presents a flowchart illustrating the process of an egress border switch forwarding a packet with a known destination, in accordance with an embodiment of the present invention. During operation, the switch receives a fabric-encapsulated packet via an inter-switch port (operation 432). The switch then identifies the egress switch identifier in the encapsulation header in the fabric-encapsulated packet (operation 434) and checks whether the identified switch identifier is an external switch identifier (e.g., not associated with a switch in the local fabric switch) (operation 436). It should be mentioned that a respective member switch in a fabric switch stores the switch identifier of a respective member switch of the local fabric switch. The switch modifies the encapsulation header by changing the ingress switch identifier of the encapsulation header in with a virtual switch identifier of a local virtual switch (operation 438). The switch then identifies a local border inter-switch port associated with the egress switch identifier of the encapsulation header as an egress port for the packet (operation 440) and forwards the packet via the identified port (operation 442).

Figure 4C:
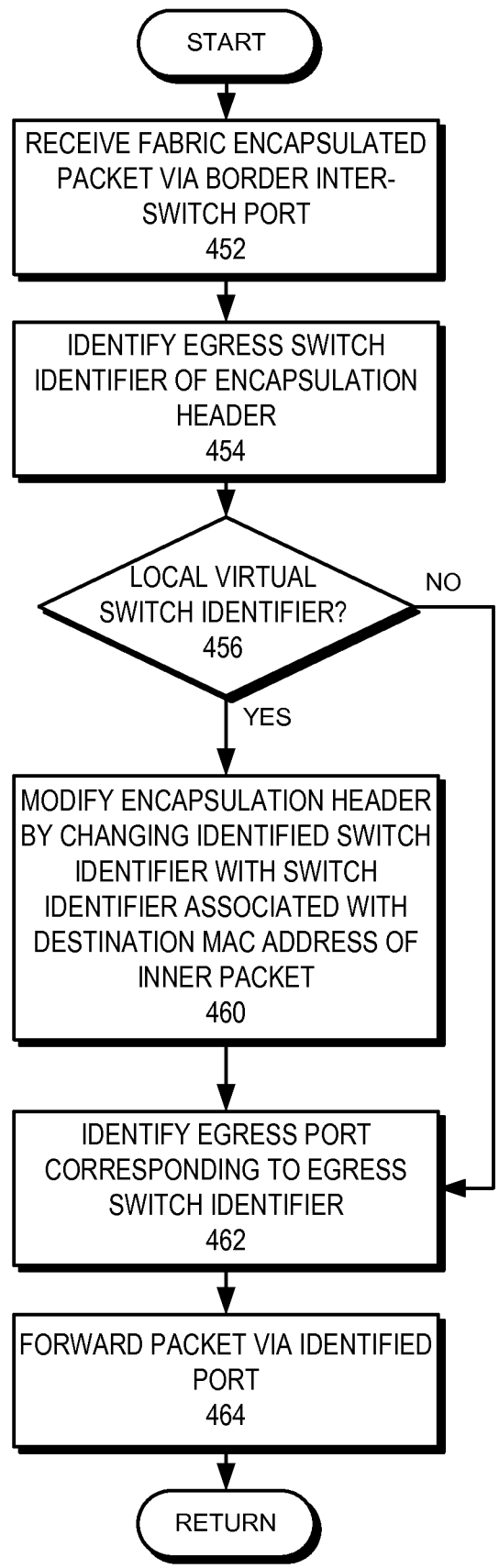
FIG. 4C presents a flowchart illustrating the process of an ingress border switch forwarding a packet with a known destination, in accordance with an embodiment of the present invention.

FIG. 4C presents a flowchart illustrating the process of an ingress border switch forwarding a packet with a known destination, in accordance with an embodiment of the present invention. During operation, the switch receives a fabric-encapsulated packet via a border inter-switch port (operation 452). The switch then identifies the egress switch identifier in the encapsulation header of the fabric-encapsulated packet (operation 354) and checks whether the egress switch identifier is a local virtual switch identifier (operation 456). A local virtual switch identifier is associated with the virtual switch represented by the local fabric switch (i.e., the fabric switch in which the switch is a member).

If the egress switch identifier is a local virtual switch identifier, the switch modifies the encapsulation header by changing the identified switch identifier with a switch identifier associated with the destination MAC address of the inner packet of the fabric-encapsulated packet (operation 460). In some embodiments, the switch decapsulates the fabric-encapsulated packet and re-encapsulates the inner packet to perform operation 460. The switch identifies an egress port associated with the egress switch identifier (operation 462) and forwards the encapsulated packet via the identified port (operation 464).

Exemplary Switch

Figure 5:
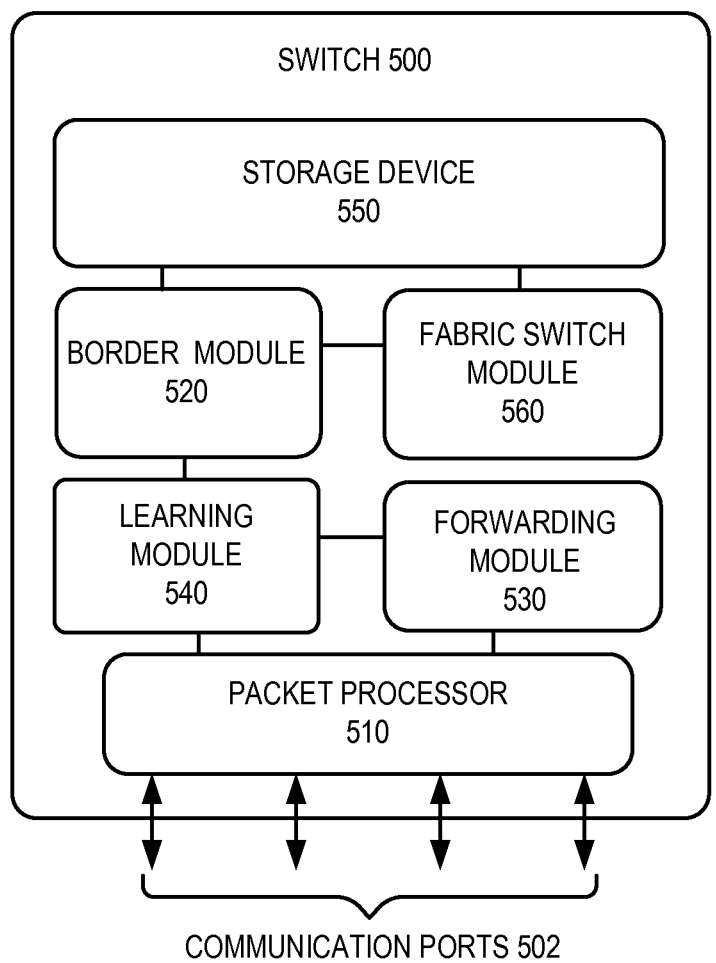
FIG. 5 illustrates an exemplary switch with transparent fabric switch interconnection support, in accordance with an embodiment of the present invention.

FIG. 5 illustrates an exemplary switch with transparent fabric switch interconnection support, in accordance with an embodiment of the present invention. In this example, a switch 500 includes a number of communication ports 502, a packet processor 510, a border module 520, and a storage device 550. Packet processor 510 extracts and processes header information from the received frames.

In some embodiments, switch 500 maintains a membership in a fabric switch, as described in conjunction with FIG. 1, wherein switch 500 also includes a fabric switch module 560. Fabric switch module 560 maintains a configuration database in storage device 550 that maintains the configuration state of every switch within the fabric switch. Fabric switch module 560 maintains the state of the fabric switch, which is used to join other switches. In some embodiments, switch 500 can be configured to operate in conjunction with a remote switch as an Ethernet switch.

Communication ports 502 can include inter-switch communication channels for communication within the fabric switch. This inter-switch communication channel can be implemented via a regular communication port and based on any open or proprietary format. Communication ports 502 can also include one or more border inter-switch communication ports for communication via compatible networks. Communication ports 502 can include one or more TRILL ports capable of receiving frames encapsulated in a TRILL header. Communication ports 502 can also include one or more IP ports capable of receiving IP packets. An IP port is capable of receiving an IP packet and can be configured with an IP address. Packet processor 510 can process TRILL-encapsulated frames and/or IP packets.

During operation, border module 520 determines that an egress switch identifier in the encapsulation header of a packet is associated with a switch outside of the fabric switch. In response to the determination, border module 520 changes the ingress switch identifier in the encapsulation header to a virtual switch identifier associated with a virtual switch representing the fabric switch. On the other hand, if border module 520 determines that an egress switch identifier in an encapsulation header of a packet is the virtual switch identifier, border module 520 changes the egress switch identifier in the encapsulation header to a switch identifier which identifies a member switch in the fabric switch.

In some embodiments, switch 500 includes a forwarding module 530 which determines that an egress switch identifier in the encapsulation header of a packet is a switch identifier of the switch. The ingress switch identifier in the encapsulation header can be a virtual switch identifier associated with a remote fabric switch. Forwarding module 530 can also determine an external switch as a next-hop switch in a compatible network for a fabric-encapsulated packet. Switch 500 can further include a learning module 540 which learns the MAC address from the inner packet of the packet and stores the learned MAC address in association with the virtual switch identifier associated with the remote fabric switch in storage device 550.

Note that the above-mentioned modules can be implemented in hardware as well as in software. In one embodiment, these modules can be embodied in computer-executable instructions stored in a memory which is coupled to one or more processors in switch 500. When executed, these instructions cause the processor(s) to perform the aforementioned functions.

In summary, embodiments of the present invention provide a switch and a method for transparently interconnecting fabric switches. In one embodiment, the switch includes a fabric switch module and a border module. The fabric switch module maintains a membership in a first fabric switch. A fabric switch includes a plurality of switches and operates as a single switch. The border module determines that the egress switch identifier in a first encapsulation header of a first packet is associated with a switch outside of the fabric switch. The first packet is forwarded in the first fabric switch based on the first encapsulation header. In response to the determination, the border module changes the ingress switch identifier in the first encapsulation header of the first packet to a first virtual switch identifier associated with a first virtual switch. This first virtual switch externally represents the first fabric switch.

The methods and processes described herein can be embodied as code and/or data, which can be stored in a computer-readable non-transitory storage medium. When a computer system reads and executes the code and/or data stored on the computer-readable non-transitory storage medium, the computer system performs the methods and processes embodied as data structures and code and stored within the medium.

The methods and processes described herein can be executed by and/or included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

The foregoing descriptions of embodiments of the present invention have been presented only for purposes of illustration and description. They are not intended to be exhaustive or to limit this disclosure. Accordingly, many modifications and variations will be apparent to practitioners skilled in the art. The scope of the present invention is defined by the appended claims.

What is claimed is:

1. A switch, comprising:
control circuitry configured to:
  maintain a membership in a first network of interconnected switches, wherein the first network of interconnected switches is identified by a fabric identifier; and
  determine that a virtual switch representing a second network of interconnected switches is a next-hop switch reachable via a local port;
border circuitry configured to:
  determine that an egress switch identifier in a first encapsulation header of a first packet is assigned to the virtual switch, wherein the first packet is forwardable in the first network of interconnected switches based on the first encapsulation header; and
  update the first packet by replacing an ingress switch identifier in the first encapsulation header with a first virtual switch identifier representing the first network of interconnected switches, wherein the egress switch identifier is a second virtual switch identifier assigned to the virtual switch, and wherein the first and second virtual switch identifiers are distinct from a switch identifier identifying a physical switch in a network of interconnected switches; and
forwarding circuitry configured to determine the local port as an egress port for the updated first packet based on the egress switch identifier in the first encapsulation header.

2. The switch of claim 1, wherein the second virtual switch identifier assigned to the virtual switch is a switch identifier in a routed network.

3. The switch of claim 2, wherein routing information of a second switch in the first network of interconnected switches indicates that the virtual switch is reachable via the switch.

4. The switch of claim 2, wherein the border circuitry is further configured to:
determine that an egress switch identifier in a second encapsulation header of a second packet is the first virtual switch identifier; and
in response to the determination, replace the egress switch identifier in the second encapsulation header of the second packet with a switch identifier which identifies a member switch in the first network of interconnected switches.

5. The switch of claim 4, wherein an ingress switch identifier in the second encapsulation header of the second packet is the second virtual switch identifier.

6. The switch of claim 2, wherein the forwarding circuitry is further configured to determine that an egress switch identifier in a third encapsulation header of a third packet is a switch identifier of the switch, wherein an ingress switch identifier in the second encapsulation header of the third packet is the second virtual switch identifier; and
wherein the switch further comprises learning circuitry configured to:
  learn a media access control (MAC) address from an inner packet of the third packet; and
  store the learned MAC address in association with the second virtual switch identifier in a storage device.

7. The switch of claim 1, wherein the forwarding circuitry is further configured to determine the local port an egress port by looking up the next-hop switch for the updated first packet based on the egress switch identifier in the first encapsulation header.

8. The switch of claim 1, wherein the first encapsulation header is one or more of:
   a Transparent Interconnection of Lots of Links (TRILL) header, wherein the ingress and egress switch identifiers of the first encapsulation header are TRILL routing bridge (RBridge) identifiers; and
   a Internet Protocol (IP) header, wherein the ingress and egress switch identifiers of the first encapsulation header are IP addresses.

9. A method, comprising:
   maintaining a membership of a switch in a first network of interconnected switches, wherein the first network of interconnected switches is identified by a fabric identifier;
   determining that a virtual switch representing a second network of interconnected switches is a next-hop switch reachable via a local port of the switch;
   determining that an egress switch identifier in a first encapsulation header of a first packet is assigned to the virtual switch, wherein the first packet is forwardable in the first network of interconnected switches based on the first encapsulation header;
   updating the first packet by replacing an ingress switch identifier in the first encapsulation header with a first virtual switch identifier representing the first network of interconnected switches, wherein the egress switch identifier is a second virtual switch identifier assigned to the virtual switch, and wherein the first and second virtual switch identifiers are distinct from a switch identifier identifying a physical switch in a network of interconnected switches; and
   determining the local port as an egress port for the updated first packet based on the egress switch identifier in the first encapsulation header.

10. The method of claim 9, wherein the second virtual switch identifier assigned to the virtual switch is a switch identifier in a routed network.

11. The method of claim 10, wherein routing information of a second switch in the first network of interconnected switches indicates that the virtual switch is reachable via the switch.

12. The method of claim 10, further comprising:
   determining that an egress switch identifier in a second encapsulation header of a second packet is the first virtual switch identifier; and
   in response to the determination, replacing the egress switch identifier in the second encapsulation header of the second packet with a switch identifier which identifies a member switch in the first network of interconnected switches.

13. The method of claim 12, wherein an ingress switch identifier in the second encapsulation header of the second packet is the second virtual switch identifier.

14. The method of claim 10, further comprising:
   determining that an egress switch identifier in a third encapsulation header of a third packet is a switch identifier of the switch, wherein an ingress switch identifier in the second encapsulation header of the third packet is the second virtual switch identifier;
   learning a media access control (MAC) address from an inner packet of the third packet; and
   storing the learned MAC address in association with the second virtual switch identifier in a storage device.

15. The method of claim 9, wherein determining the local port an egress port includes looking up the next-hop switch for the updated first packet based on the egress switch identifier in the first encapsulation header.

16. The method of claim 9, wherein the first encapsulation header is one or more of:
   a Transparent Interconnection of Lots of Links (TRILL) header, wherein the ingress and egress switch identifiers of the first encapsulation header are TRILL routing bridge (RBridge) identifiers; and
   a Internet Protocol (IP) header, wherein the ingress and egress switch identifiers of the first encapsulation header are IP addresses.

17. A computer system; comprising:
   a processor;
   a storage device coupled to the processor and storing instructions that when executed by the processor cause the processor to perform a method, the method comprising:
   maintaining a membership of a switch in a first network of interconnected switches, wherein the first network of interconnected switches is identified by a fabric identifier;
   determining that a virtual switch representing a second network of interconnected switches is a next-hop switch reachable via a local port of the switch;
   determining that an egress switch identifier in a first encapsulation header of a first packet is assigned to the virtual switch, wherein the first packet is forwardable in the first network of interconnected switches based on the first encapsulation header; and
   updating the first packet by replacing an ingress switch identifier in the first encapsulation header with a first virtual switch identifier representing the first network of interconnected switches, wherein the egress switch identifier is a second virtual switch identifier assigned to the virtual switch, and wherein the first and second virtual switch identifiers are distinct from a switch identifier identifying a physical switch in a network of interconnected switches; and
   determining the local port as an egress port for the updated first packet based on the egress switch identifier in the first encapsulation header.

18. The computer system of claim 17, wherein the second virtual switch identifier assigned to the virtual switch is a switch identifier in a routed network.

19. The computer system of claim 18, wherein routing information of a second switch in the first network of interconnected switches indicates that the virtual switch is reachable via the switch.

20. The computer system of claim 18, wherein the method further comprises:
   determining that an egress switch identifier in a second encapsulation header of a second packet is the first virtual switch identifier; and
   in response to the determination, replacing the egress switch identifier in the second encapsulation header of the second packet with a switch identifier which identifies a member switch in the first network of interconnected switches.

21. The computer system of claim 20, wherein an ingress switch identifier in the second encapsulation header of the second packet is the second virtual switch identifier.

22. The computer system of claim 18, wherein the method further comprises:
   determining that an egress switch identifier in a third encapsulation header of a third packet is a switch identifier of the switch, wherein an ingress switch identifier in the second encapsulation header of the third packet is the second virtual switch identifier;

learning a media access control (MAC) address from an inner packet of the third packet; and storing the learned MAC address in association with the second virtual switch identifier in a storage device.

23. The computer system of claim 17, wherein the method further comprises determining the local port an egress port includes looking up the next-hop switch for the updated first packet based on the egress switch identifier in the first encapsulation header.

24. The computer system of claim 17, wherein the first encapsulation header is one or more of:

a Transparent Interconnection of Lots of Links (TRILL) header, wherein the ingress and egress switch identifiers of the first encapsulation header are TRILL routing bridge (RBridge) identifiers; and a Internet Protocol (IP) header, wherein the ingress and egress switch identifiers of the first encapsulation header are IP addresses.

25. A non-transitory computer-readable storage medium storing instructions which when executed by a computer cause the computer to perform a method, the method comprising:

maintaining a membership of a switch in a first network of interconnected switches, wherein the first network of interconnected switches is identified by a fabric identifier;

determining that a virtual switch representing a second network of interconnected switches is a next-hop switch reachable via a local port of the switch;

determining that an egress switch identifier in a first encapsulation header of a first packet is assigned to the virtual switch, wherein the first packet is forwardable in the first network of interconnected switches based on the first encapsulation header;

updating the first packet by replacing an ingress switch identifier in the first encapsulation header with a first virtual switch identifier representing the first network of interconnected switches, wherein the egress switch identifier is a second virtual switch identifier assigned to the virtual switch, and wherein the first and second virtual switch identifiers are distinct from a switch identifier identifying a physical switch in a network of interconnected switches; and determining the local port as an egress port for the updated first packet based on the egress switch identifier in the first encapsulation header.

* * * * *